United States Patent
Maxik et al.

(10) Patent No.: US 8,730,558 B2
(45) Date of Patent: May 20, 2014

(54) WAVELENGTH CONVERTING LIGHTING DEVICE AND ASSOCIATED METHODS

(71) Applicant: Lighting Science Group Corporation, Satellite Beach, FL (US)

(72) Inventors: Fredric S. Maxik, Indialantic, FL (US); Robert R. Soler, Cocoa Beach, FL (US); David E. Bartine, Cocoa, FL (US); Ran Zhou, Melbourne, FL (US); Valerie A. Bastien, Melbourne, FL (US)

(73) Assignee: Lighting Science Group Corporation, Satellite Beach, FL (US)

( * ) Notice: Subject to any disclaimer, the term of this patent is extended or adjusted under 35 U.S.C. 154(b) by 0 days.

(21) Appl. No.: 13/633,914

(22) Filed: Oct. 3, 2012

(65) Prior Publication Data

US 2013/0271818 A1    Oct. 17, 2013

Related U.S. Application Data

(63) Continuation of application No. 13/073,805, filed on Mar. 28, 2011, now Pat. No. 8,384,984.

(51) Int. Cl.
*G02B 26/00* (2006.01)

(52) U.S. Cl.
USPC .......................................................... 359/291

(58) Field of Classification Search
USPC ......... 359/290–292, 295, 298, 220, 223, 334, 359/224
See application file for complete search history.

(56) References Cited

U.S. PATENT DOCUMENTS

| | | |
|---|---|---|
| 5,523,878 A | 6/1996 | Wallace et al. |
| 5,704,701 A | 1/1998 | Kavanagh et al. |
| 5,813,753 A | 9/1998 | Vriens et al. |
| 5,997,150 A | 12/1999 | Anderson |
| 6,140,646 A | 10/2000 | Busta et al. |
| 6,341,876 B1 | 1/2002 | Moss et al. |
| 6,356,700 B1 | 3/2002 | Strobl |
| 6,561,656 B1 | 5/2003 | Kojima et al. |
| 6,594,090 B2 | 7/2003 | Kruschwitz et al. |
| 6,733,135 B2 | 5/2004 | Dho |
| 6,767,111 B1 | 7/2004 | Lai |
| 6,817,735 B2 | 11/2004 | Shimizu et al. |
| 6,870,523 B1 | 3/2005 | Ben-David et al. |
| 6,871,982 B2 | 3/2005 | Holman et al. |

(Continued)

FOREIGN PATENT DOCUMENTS

| | | |
|---|---|---|
| EP | 0851260 | 7/1998 |
| WO | WO2012/135173 | 10/2012 |

OTHER PUBLICATIONS

Arthur P. Fraas, Heat Exchanger Design, 1989, p. 60, John Wiley & Sons, Inc., Canada.

(Continued)

*Primary Examiner* — Tuyen Tra

(74) *Attorney, Agent, or Firm* — Mark R. Malek; Daniel C. Pierron; Zies Widerman & Malek

(57) ABSTRACT

A lighting device is described for receiving source light within a source wavelength range, converting the source light into a converted light, and reflecting the converted light to a desired output direction. The lighting device may use a micro electromechanical system (MEMS) device to receive and redirect the source light to the desired output direction. A conversion coating may be applied to the operative surface of the MEMS device to convert the source light into a converted light.

22 Claims, 21 Drawing Sheets

(56) References Cited

U.S. PATENT DOCUMENTS

| | | |
|---|---|---|
| 6,967,761 B2 | 11/2005 | Starkweather et al. |
| 6,974,713 B2 | 12/2005 | Patel et al. |
| 7,042,623 B1 | 5/2006 | Huibers et al. |
| 7,070,281 B2 | 7/2006 | Kato |
| 7,072,096 B2 | 7/2006 | Holman et al. |
| 7,075,707 B1 | 7/2006 | Rapaport et al. |
| 7,083,304 B2 | 8/2006 | Rhoads |
| 7,178,941 B2 | 2/2007 | Roberge et al. |
| 7,184,201 B2 | 2/2007 | Duncan |
| 7,187,484 B2 | 3/2007 | Mehrl |
| 7,213,926 B2 | 5/2007 | May et al. |
| 7,246,923 B2 | 7/2007 | Conner |
| 7,247,874 B2 | 7/2007 | Bode et al. |
| 7,255,469 B2 | 8/2007 | Wheatley et al. |
| 7,261,453 B2 | 8/2007 | Morejon et al. |
| 7,289,090 B2 | 10/2007 | Morgan |
| 7,300,177 B2 | 11/2007 | Conner |
| 7,303,291 B2 | 12/2007 | Ikeda et al. |
| 7,325,956 B2 | 2/2008 | Morejon et al. |
| 7,342,658 B2 | 3/2008 | Kowarz et al. |
| 7,344,279 B2 | 3/2008 | Mueller et al. |
| 7,349,095 B2 | 3/2008 | Kurosaki |
| 7,353,859 B2 | 4/2008 | Stevanovic et al. |
| 7,369,056 B2 | 5/2008 | McCollough et al. |
| 7,382,091 B2 | 6/2008 | Chen |
| 7,382,632 B2 | 6/2008 | Alo et al. |
| 7,400,439 B2 | 7/2008 | Holman |
| 7,427,146 B2 | 9/2008 | Conner |
| 7,429,983 B2 | 9/2008 | Islam |
| 7,434,946 B2 | 10/2008 | Huibers |
| 7,438,443 B2 | 10/2008 | Tatsuno et al. |
| 7,476,016 B2 | 1/2009 | Kurihara |
| 7,520,642 B2 | 4/2009 | Holman et al. |
| 7,530,708 B2 | 5/2009 | Park |
| 7,537,347 B2 | 5/2009 | Dewald |
| 7,540,616 B2 | 6/2009 | Conner |
| 7,556,406 B2 | 7/2009 | Petroski et al. |
| 7,598,686 B2 | 10/2009 | Lys et al. |
| 7,605,971 B2 | 10/2009 | Ishii et al. |
| 7,626,755 B2 | 12/2009 | Furuya et al. |
| 7,677,736 B2 | 3/2010 | Kazasumi et al. |
| 7,684,007 B2 | 3/2010 | Hull et al. |
| 7,703,943 B2 | 4/2010 | Li et al. |
| 7,705,810 B2 | 4/2010 | Choi et al. |
| 7,709,811 B2 | 5/2010 | Conner |
| 7,719,766 B2 | 5/2010 | Grasser et al. |
| 7,728,846 B2 | 6/2010 | Higgins et al. |
| 7,732,825 B2 | 6/2010 | Kim et al. |
| 7,766,490 B2 | 8/2010 | Harbers et al. |
| 7,819,556 B2 | 10/2010 | Heffington et al. |
| 7,828,453 B2 | 11/2010 | Tran et al. |
| 7,828,465 B2 | 11/2010 | Roberge et al. |
| 7,832,878 B2 | 11/2010 | Brukilacchio et al. |
| 7,834,867 B2 | 11/2010 | Sprague et al. |
| 7,835,056 B2 | 11/2010 | Doucet et al. |
| 7,841,714 B2 | 11/2010 | Grueber |
| 7,845,823 B2 | 12/2010 | Mueller et al. |
| 7,855,376 B2 | 12/2010 | Cantin et al. |
| 7,871,839 B2 | 1/2011 | Lee |
| 7,880,400 B2 | 2/2011 | Zhou et al. |
| 7,889,430 B2 | 2/2011 | El-Ghoroury et al. |
| 7,906,789 B2 | 3/2011 | Jung et al. |
| 7,928,565 B2 | 4/2011 | Brunschwiler et al. |
| 7,972,030 B2 | 7/2011 | Li |
| 7,976,205 B2 | 7/2011 | Grotsch et al. |
| 8,016,443 B2 | 9/2011 | Falicoff et al. |
| 8,040,070 B2 | 10/2011 | Myers et al. |
| 8,047,660 B2 | 11/2011 | Penn et al. |
| 8,049,763 B2 | 11/2011 | Kwak et al. |
| 8,061,857 B2 | 11/2011 | Liu et al. |
| 8,070,302 B2 | 12/2011 | Hatanaka et al. |
| 8,076,680 B2 | 12/2011 | Lee et al. |
| 8,083,364 B2 | 12/2011 | Allen |
| 8,096,668 B2 | 1/2012 | Abu-Ageel |
| 8,115,419 B2 | 2/2012 | Given et al. |
| 8,188,687 B2 | 5/2012 | Lee et al. |
| 2004/0052076 A1 | 3/2004 | Mueller et al. |
| 2005/0218780 A1 | 10/2005 | Chen |
| 2006/0002108 A1 | 1/2006 | Ouderkirk et al. |
| 2006/0002110 A1 | 1/2006 | Dowling et al. |
| 2006/0164005 A1 | 7/2006 | Sun |
| 2006/0164607 A1 | 7/2006 | Morejon et al. |
| 2006/0232992 A1 | 10/2006 | Bertram et al. |
| 2006/0285193 A1 | 12/2006 | Kimura et al. |
| 2007/0013871 A1 | 1/2007 | Marshall et al. |
| 2007/0159492 A1 | 7/2007 | Lo et al. |
| 2007/0188847 A1 | 8/2007 | McDonald et al. |
| 2007/0241340 A1 | 10/2007 | Pan |
| 2008/0062644 A1 | 3/2008 | Petroski |
| 2008/0143973 A1 | 6/2008 | Wu |
| 2008/0198572 A1 | 8/2008 | Medendorp |
| 2008/0232084 A1 | 9/2008 | Kon |
| 2008/0258643 A1 | 10/2008 | Cheng et al. |
| 2008/0316432 A1 | 12/2008 | Tejada et al. |
| 2009/0009102 A1 | 1/2009 | Kahlman et al. |
| 2009/0059099 A1 | 3/2009 | Linkov et al. |
| 2009/0059585 A1 | 3/2009 | Chen et al. |
| 2009/0128781 A1 | 5/2009 | Li |
| 2009/0160370 A1 | 6/2009 | Tai et al. |
| 2009/0232683 A1 | 9/2009 | Hirata et al. |
| 2009/0261748 A1 | 10/2009 | McKinney et al. |
| 2009/0262516 A1 | 10/2009 | Li |
| 2009/0273931 A1 | 11/2009 | Ito et al. |
| 2010/0006762 A1 | 1/2010 | Yoshida et al. |
| 2010/0051976 A1 | 3/2010 | Rooymans |
| 2010/0053959 A1 | 3/2010 | Ljzerman et al. |
| 2010/0060181 A1 | 3/2010 | Choi et al. |
| 2010/0061068 A1 | 3/2010 | Geissler et al. |
| 2010/0061078 A1 | 3/2010 | Kim |
| 2010/0072494 A1 | 3/2010 | Lee |
| 2010/0103389 A1 | 4/2010 | McVea et al. |
| 2010/0202129 A1 | 8/2010 | Abu-Ageel |
| 2010/0213859 A1 | 8/2010 | Shteynberg et al. |
| 2010/0231136 A1 | 9/2010 | Reisenauer et al. |
| 2010/0231863 A1 | 9/2010 | Hikmet et al. |
| 2010/0244700 A1 | 9/2010 | Chong et al. |
| 2010/0244724 A1 | 9/2010 | Jacobs et al. |
| 2010/0270942 A1 | 10/2010 | Hui et al. |
| 2010/0277084 A1 | 11/2010 | Lee et al. |
| 2010/0302464 A1 | 12/2010 | Raring et al. |
| 2010/0308738 A1 | 12/2010 | Shteynberg et al. |
| 2010/0308739 A1 | 12/2010 | Shteynberg et al. |
| 2010/0315320 A1 | 12/2010 | Yoshida |
| 2010/0320927 A1 | 12/2010 | Gray et al. |
| 2010/0320928 A1 | 12/2010 | Kaihotsu et al. |
| 2010/0321641 A1 | 12/2010 | Van Der Lubbe |
| 2010/0321933 A1 | 12/2010 | Hatanaka et al. |
| 2011/0012137 A1 | 1/2011 | Lin et al. |
| 2011/0080635 A1 | 4/2011 | Takeuchi |
| 2012/0250137 A1 | 10/2012 | Maxik et al. |

OTHER PUBLICATIONS

H. A El-Shaikh, S. V. Garimella, "Enhancement of Air Jet Impingement Heat Transfer using Pin-Fin Heat Sinks", D IEEE Transactions on Components and Packaging Technology, Jun. 2000, vol. 23, No. 2.

J. Y. San, C. H. Huang, M. H, Shu, "Impingement cooling of a confined circular air jet", In t. J. Heat Mass Transf., 1997. pp. 1355-1364, vol. 40.

U.S. Appl. No. 13/234,371, Sep. 16, 2011, Maxik et al.

U.S. Appl. No. 13/357,283, Jan. 24, 2012, Maxik et al.

U.S. Appl. No. 13/465,781, May 7, 2012, Maxik et al.

N. T. Obot, W. J. Douglas, A S. Mujumdar, "Effect of Semi-confinement on Impingement Heat Transfer", Proc. 7th Int. Heat Transf. Conf., 1982, pp. 1355-1364. vol. 3.

(56) References Cited

OTHER PUBLICATIONS

S. A Solovitz, L. D. Stevanovic, R. A Beaupre, "Microchannels Take Heatsinks to the Next Level", Power Electronics Technology, Nov. 2006.

Tannith Cattermole, "Smart Energy Class controls light on demand", Gizmag.com, Apr. 18, 2010 accessed Nov. 1, 2011.

Yongmann M. Chung, Kai H. Luo, "Unsteady Heat Transfer Analysis of an Impinging Jet", Journal of Heat Transfer—Transactions of the ASME, Dec. 2002, pp. 1039-1048, vol. 124, No. 6.

Jones, Eric D., Light Emitting Diodes (LEDS) for General Lumination, an Optoelectronics Industry Development Association (OIDA) Technology Roadmap, OIDA Report, Mar. 2001, published by OIDA in Washington D.C.

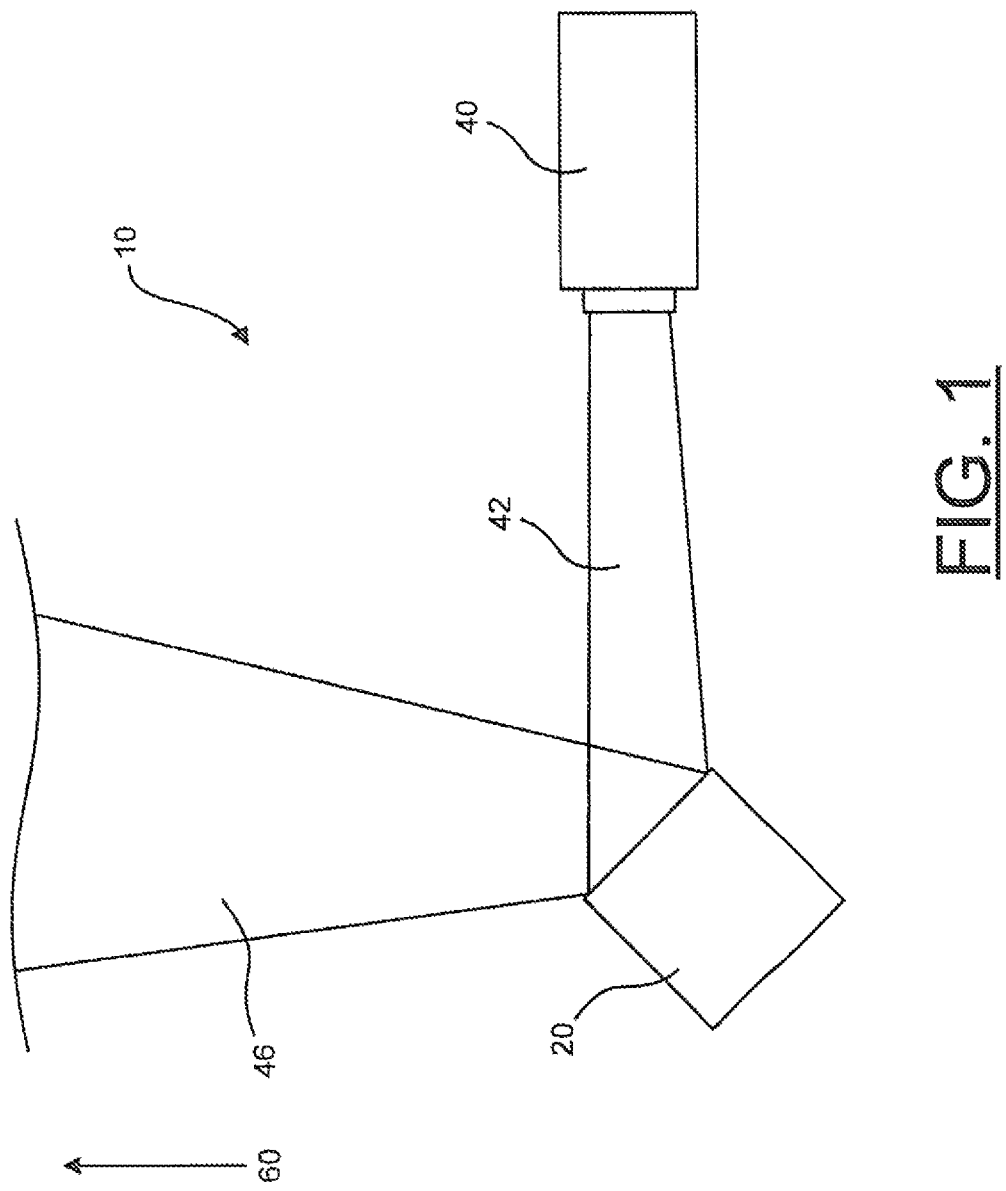

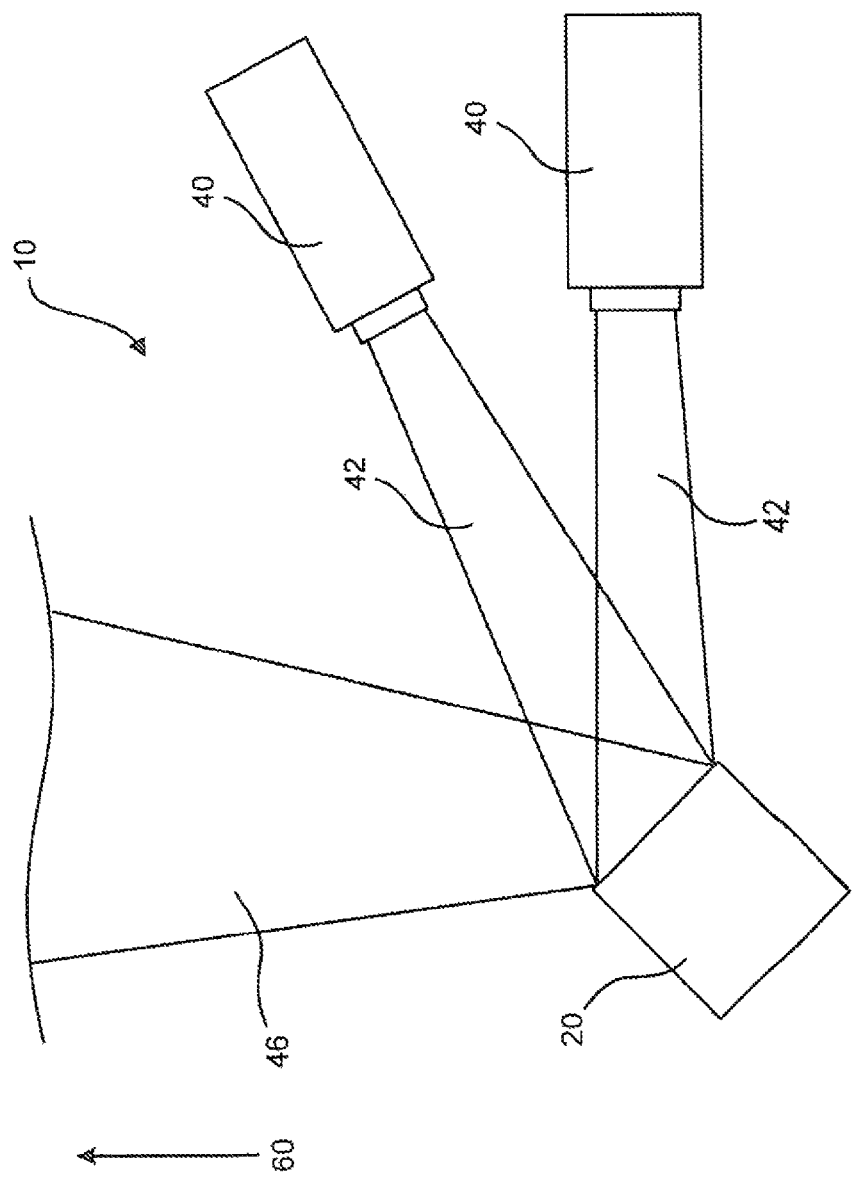

WAVELENGTH CONVERTING LIGHTING DEVICE AND ASSOCIATED METHODS

RELATED APPLICATIONS

This application is a continuation of U.S. patent application Ser. No. 13/073,805 titled "MEMS Wavelength Converting Lighting Device and Associated Methods" filed on Mar. 28, 2011 by the inventors of the present application, the entire contents of which are incorporated herein by reference.

FIELD OF THE INVENTION

The present invention relates to the field of lighting devices and, more specifically, to applying a conversion coating to a repositionable surface of a MEMS lighting device to direct a light of variable wavelength ranges in a desired output direction.

BACKGROUND OF THE INVENTION

Lighting devices that include a conversion coating conveniently allow the conversion of light from a source light source into a light of a different wavelength range. Often, such conversion coatings are created by using a phosphorous coating. These wavelength conversion coatings may sometimes applied to lenses located in line with the light projected from a light source. In some instances the conversion coating may be applied to the light source itself. A number of disclosed inventions exist that describe lighting devices that utilize a conversion coating to convert light with a source wavelength range into light converted wavelength range.

Color-mixing, tunable white lighting devices are traditionally controlled via PWM (pulse width modulation). PWM is a common technique for controlling power to electrical devices, which operates by quickly switching power between an "on" state and "off" state during each period. The period is the time between each pulse, similar to a clock rate. The ratio of the pulse period occupying the "on" state versus the "off" state defines the duty cycle. As the PWM varies the duration that the switch is kept at the "on" state, the PWM is able to vary the average power to the load device. PWM switching can be beneficial from an efficiency perspective, since it has low power loss when the switches are in the "off" state.

For lighting devices, the frequency of pulses in the PWM circuit must be sufficiently fast enough such that the human eye cannot perceive the strobe effect. To have an increasingly high pulse frequency, the period must become increasingly short. The intensity of each individual color may be controlled via variations in the duty cycle of each pulse period. With light sources that are slow to react, such as incandescent light bulbs, a relatively low pulse frequency may be required. Conversely, PWM circuits that may be used to control a perceived intensity of light emitting semiconductors must be operable at considerably higher frequencies, or otherwise risk producing visual flicker.

To achieve color mixing, a PWM circuit should generally be able to control the duty cycle on all colors intended to be mixed. Typically, any color can be created through the use of a red, green, and blue color source. With a color mixing system based on PWM circuits, the system may adjust the duty cycle for each primary color by combining the adjusted primary colors to display the desired color. The primary colors are normally combined via a lens.

Micro-electro-mechanical systems (MEMS) use a configuration different from PWM to control the intensity of light. In MEMS, the light from each light source is preferably directed to an array of microscopic mirrors, which reflect the light in different directions. Typically, a MEMS "on" state includes reflecting the light into a lens, wherein the light may be combined with light of other colors. Traditionally, multiple light sources are combined in MEMS to create a desired output color, including, for example, a red source, a green source, and a blue source.

U.S. Published Patent Application No. 2010/0046234 to Abu-Ageel discloses the use of wavelength conversion layers which include different types or amounts of phosphor. The Abu-Ageel '234 application gives an example of a wavelength conversion layer that may include a blend of red, green, and blue phosphors. These phosphors are excited by the light source and emit a light at a different wavelength range. The red, green and blue light generated by the conversion layers is then combined to form a white light. The Abu-Ageel '234 application also discloses the use of a blue light source, wherein the direct blue light is combined with a phosphor converted red and green light to create a white light. Furthermore, the Abu-Ageel '234 application specifically cites the use of micro-electro-mechanical systems (MEMS) and optical lenses which are used to focus a beam of light emitted by a source. A deflector can be used to scan a light beam between two or more types of wavelength conversion materials.

U.S. Published Patent Application No. 2010/0321641 to Van Der Lubbe discloses utilizing a one-colored light source, and converting fractions of that light into other colors. The Van Der Lubbe '641 application also discloses using phosphors arranged in a first and second set of pixels for a color converting optical element.

U.S. Pat. No. 7,832,878 to Brukilacchio et al., discloses phosphors or other wavelength converting elements that can be employed over an LED die to result in wavelengths and spectral bandwidths not readily available from a standard LED die. The Brukilacchio et al. '878 patent additionally discloses the use of a digital micromirror device (DMD) projection system in combination with a rotating color wheel.

U.S. Published Patent Application No. 2010/0302464 to Raring et al. discloses the use of a phosphor coating on an optical member to create a laser beam of a desired color by using a phosphor material to alter the light generated by LEDs and/or laser diodes. These colored laser beams may then be emitted to a DMD from an optical member.

There exists a need for a lighting device that provides an ability to receive a light emitted from a light source in one wavelength range and redirect the light in a desired output direction in another wavelength range. There further exists a need for a lighting device that combines conversion and redirection of the light emitted from a light source in one operation.

SUMMARY OF THE INVENTION

With the foregoing in mind, the invention is related to a lighting device that may advantageously receive a source light emitted from a light source in one wavelength range and redirect the light to a desired output direction in another wavelength range. The lighting device can also advantageously combine conversion and redirection of the source light in one operation. By providing one lighting device that advantageously combines these operations, the present invention may beneficially possess characteristics of reduced complexity, size, and manufacturing expense.

These and other objects, features, and advantages according to the presenting invention are provided by a lighting device for directing source light within a predetermined source wavelength range in a desired output direction that may include a MEMS device and a conversion coating. The MEMS device may include at least one operative surface to receive and redirect the source light towards the desired output direction. The conversion coating may include a phosphorous wavelength coating material, which may be applied to at least one operative surface to convert the source light into a converted light within at least one converted wavelength range. In embodiments of the present invention, the MEMS device may be a digital micromirror device (DMD). The DMD may include an array of mirrors that may be positionable between multiple angles to reflect the converted light. The predetermined source wavelength ranges may include a plurality of wavelength ranges, wherein each of the plurality of wavelength ranges may be selectively enabled.

The lighting device of the present invention may receive a source light that is a monochromatic light, bichromatic light, or polychromatic light. The source light may have a wavelength range within at least one of a blue spectrum and an ultraviolet spectrum. Source light in the ultraviolet spectrum may have a predetermined source wavelength range between 200 nanometers and 400 nanometers. Source light in the blue spectrum may have a predetermined source wavelength range between 400 nanometers and 500 nanometers.

A lighting device of the present invention may include a position detecting device. The desired output direction may include a projection surface. The position detecting device may sense a location of the projection surface to define a location of a sensed projection surface. The position detecting device may further include a repositioning device that repositions the MEMS device to project the converted light to the location of the sensed projection surface.

A method aspect of the present invention is for using the lighting device. The method may include the steps of receiving a source light, converting the source light into a converted light, and reflecting the converted light to a desired output direction. The converted light may include light within a predetermined wavelength range.

BRIEF DESCRIPTION OF THE DRAWINGS

FIG. 1 is a partial side elevation view of a lighting device according to the present invention illustrating a MEMS device receiving and reflecting light.

FIG. 1A is a partial side elevation view of an embodiment of the lighting device illustrated in FIG. 1 showing a MEMS device receiving and reflecting light from a plurality of light sources.

DETAILED DESCRIPTION OF THE PREFERRED EMBODIMENT

Figure 2:
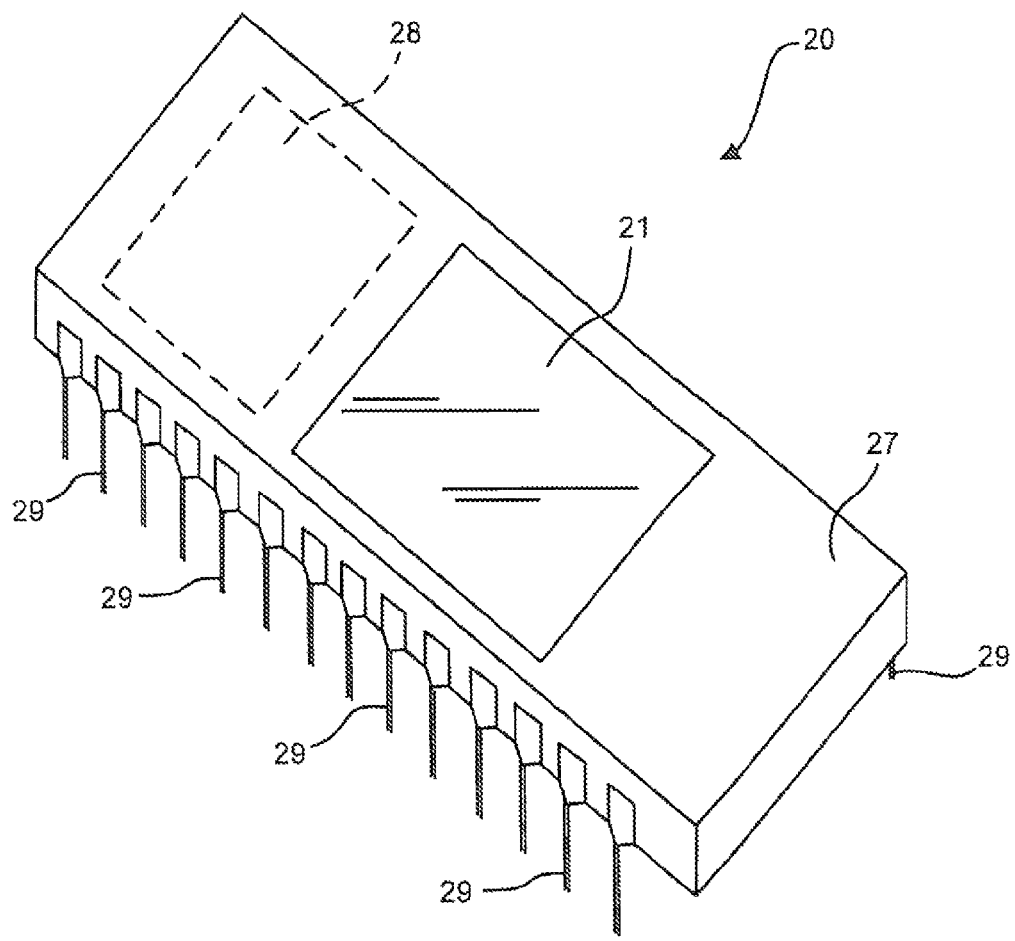
FIG. 2 is a perspective view of a MEMS device of a lighting device according to the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Referring now to FIGS. 1-15, a lighting device 10 according to the present invention in now described in greater detail. Throughout this disclosure, the lighting device 10 may also be referred to as a system or the invention. Alternate references of the lighting device 10 in this disclosure are not meant to be limiting in any way.

As perhaps best illustrated in FIG. 1, the lighting device 10 according to an embodiment of the present invention includes a device that uses a microelectromechanical system, or MEMS device 20, a source light 42, and a converted light 46. The converted light 46 may be directed by the MEMS device 20 in a desired output direction 60. A conversion coating 30 may be applied to the MEMS device 20 to convert the source light 42 into the converted light 46, as will be described in greater detail below, and as perhaps best illustrated in FIGS. 3, 4, 6A, 6B, 10, and 12.

As illustrated, for example, in FIG. 1, the MEMS device 20 may receive the source light 42. This source light 42 may originate from a light source 40. In embodiments of the present invention, the light source 40 may include light emitting diodes (LEDs) capable of emitting light in a predetermined source wavelength range. Other embodiments of the present invention may include source light 42 that is generated by a laser driven light source. Those skilled in the art will appreciate that the source light 42 may be provided by any number of lighting devices. The source wavelength range may include a source light 42 emitted in blue or ultraviolet wavelength ranges. However, a person of skill in the art, after having the benefit of this disclosure, will appreciate that LEDs capable of emitting light in any wavelength ranges may be used in the light source 40, in accordance with this disclosure of the present invention. A skilled artisan will also appreciate, after having the benefit of this disclosure, additional light generating devices that may be used in the light source 40 that are capable of creating an illumination.

As previously discussed, embodiments of the present invention may include a light source 40 that generates source light 42 with a source wavelength range in the blue spectrum. The blue spectrum may include light with a wavelength range between 400 and 500 nanometers. A source light 42 in the blue spectrum may be generated by a light emitting semiconductor that is comprised of materials that may emit a light in the blue spectrum. Examples of such light emitting semiconductor materials may include, but are not intended to be limited to, zinc selenide (ZnSe) or indium gallium nitride (InGaN). These semiconductor materials may be grown or formed on substrates, which may be comprised of materials such as sapphire, silicon carbide (SiC), or silicon (Si). A person of skill in the art will appreciate that, although the preceding semiconductor materials have been disclosed herein, any semiconductor device capable of emitting a light in the blue spectrum is intended to be included within the scope of the present invention.

Additionally, as previously discussed, embodiments of the present invention may include a light source 40 that generates source light 42 with a source wavelength range in the ultraviolet spectrum. The ultraviolet spectrum may include light with a wavelength range between 200 and 400 nanometers. A source light 42 in the ultraviolet spectrum may be generated by a light emitting semiconductor that is comprised of materials that may emit a light in the ultraviolet spectrum. Examples of such light emitting semiconductor materials may include, but are not intended to be limited to, diamond (C), boron nitride (BN), aluminum nitride (AlN), aluminum gallium nitride (AlGaN), or aluminum gallium indium nitride (AlGaInN). These semiconductor materials may be grown or formed on substrates, which may be comprised of materials such as sapphire, silicon carbide (SiC), or Silicon (Si). A person of skill in the art will appreciate that, although the preceding semiconductor materials have been disclosed herein, any semiconductor device capable of emitting a light in the ultraviolet spectrum is intended to be included within the scope of the present invention.

The light source 40 of the present invention may include an organic light emitting diode (OLED). An OLED may be a comprised of an organic compound that may emit light when an electric current is applied. The organic compound may be positioned between two electrodes. Typically, at least one of the electrodes may be transparent.

The light source 40 may produce a source light 42 with an organic wavelength range, or wavelength range that triggers psychological cues within the human brain. These organic wavelength ranges may include one or more wavelength ranges that trigger positive psychological responses. The positive psychological responses may be similar to those realized in response to natural light or sunlight.

A person of skill in the art will appreciate that the lighting device 10 may receive a source light 42 that is monochromatic, bichromatic, or polychromatic. A monochromatic light is a light that may include one wavelength range. As perhaps best illustrated in FIG. 1A, a bichromatic light is a light that includes two wavelength ranges, which may be derived from one or two light sources 40. A polychromatic light is a light that may include a plurality of wavelength ranges, which may be derived from one or more light sources 40.

Referring now additionally to FIG. 2, additional features of the lighting device 10 of the present invention will now be discussed in greater detail. More specifically, the MEMS device 20 will now be discussed. A MEMS device 20 is formally known as a microelectromechanical system device. This name reflects the nature of MEMS devices 20, since many microscopic mechanical components are included as part of a total system. The mechanical components may be organized into MEMS cells 22, wherein an array of MEMS cells 22 may be included in the MEMS package 21. As perhaps best illustrated in the block diagram of FIG. 2A, the MEMS package 21, along with a microcontroller 28, and other additional components, may collectively comprise the MEMS device 20.

The components of a MEMS device 20 are mechanical because the MEMS device 20 may be comprised of a plurality of movable parts. These movable parts, which collectively form the components, may include a repositionable surface 34 and positioning components 24, which will be discussed in greater detail below, and which are perhaps be best illustrated in FIG. 4. The positioning components 24 may be used to manipulate the repositionable surface 34. The components that collectively form a MEMS cell 22 will be discussed in greater detail below.

The components are microscopic because the movable parts may be very small, and may only be measurable on a micrometer scale. The components may also be part of a system. Due to a miniaturization of components of the MEMS device 20, the components may be densely located in a small area. Several microscopic components may be operatively connected to form a MEMS cell 22. As a result, a plurality of microscopic components operatively connected in a small area may be configured as a plurality of MEMS cells 22. Dense collections of MEMS cells 22 may be packaged together, such as, for example, on a semiconductor, in a MEMS package 21. A person of skill in the art will appreciate that some MEMS configurations, such as with larger MEMS configurations, may be packaged on multiple semiconductors, which may be interconnected and may intercommunicate as a system.

Figure 2A:
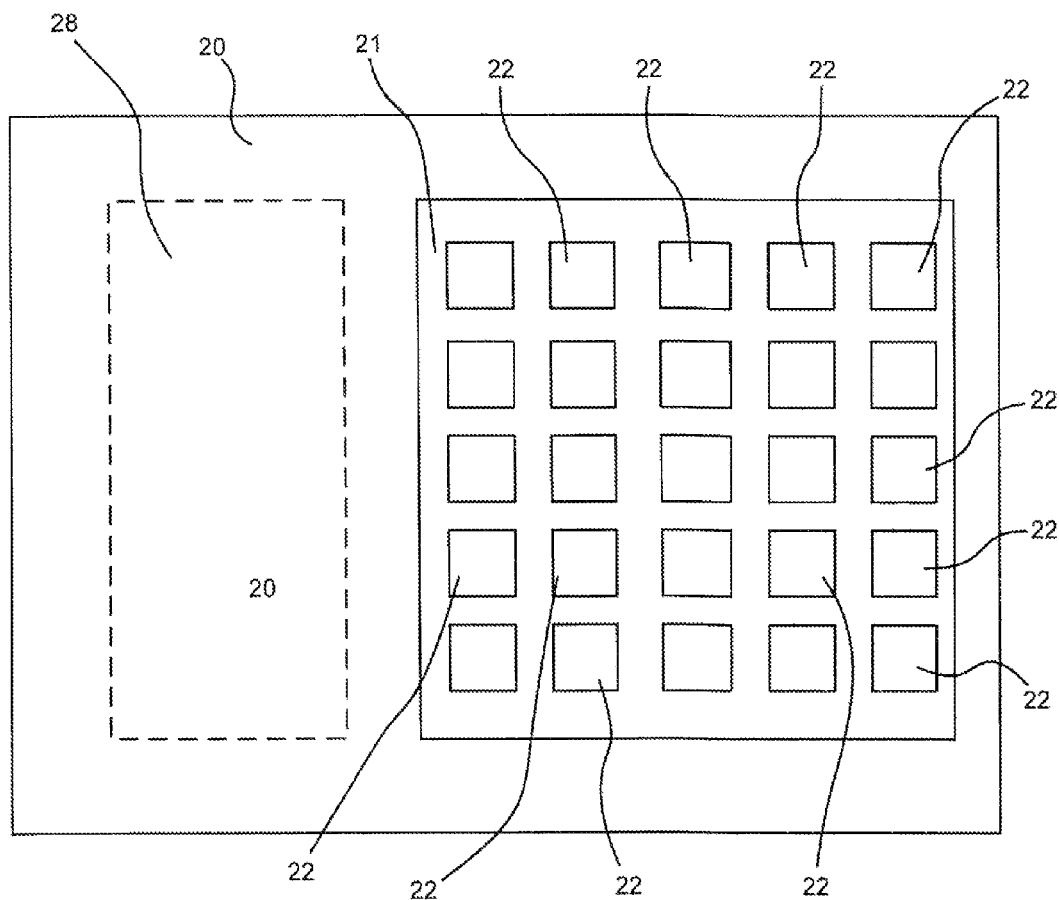
FIG. 2A is a schematic block diagram of the MEMS device illustrated in FIG. 2.

Referring now to FIGS. 2 and 2A, the MEMS device 20, and more specifically the MEMS package 21, of the light device 10 will now be discussed greater detail. A MEMS package 21 may be included in larger electronic systems or located on a dedicated integrated circuit (IC) chip. In some embodiments of the present invention, the components of the IC may collectively form a MEMS device 20. In the foregoing description, for illustrative purposes that are not intended to be limiting, this disclosure of the present invention assumes that the MEMS package 21 is located on an IC. A person of skill in the art, after having the benefit of this disclosure, however, will appreciate the numerous applications for integrating a MEMS package 21, in addition to those mentioned herein, that may or may not include an IC. As a result, a skilled artisan should not interpret the description of a MEMS package 21 as being integrated into an IC as limiting.

In addition to the MEMS package 21, the MEMS device 20 may additionally include a microcontroller 28 and IC contacts 29, which may be included in an IC body 27. The microcontroller 28 may receive one or more input signals via the IC contacts 29. The input signal may include information regarding the desired operation of the mechanical parts of the MEMS device 20. The microcontroller 28 may then process the information received in the input signal to determine control signals that may operate each MEMS cell 22 of the MEMS device 20. The control signals may be used to control the position of the mechanical components of each MEMS cell 22. Through the selective positioning of the mechanical components of individual MEMS cells 22, the lighting device 10 of the present invention may advantageously control the characteristics of the converted light 46 by reflecting light with the desired converted wavelength range in the desired output direction 60.

Figure 3:
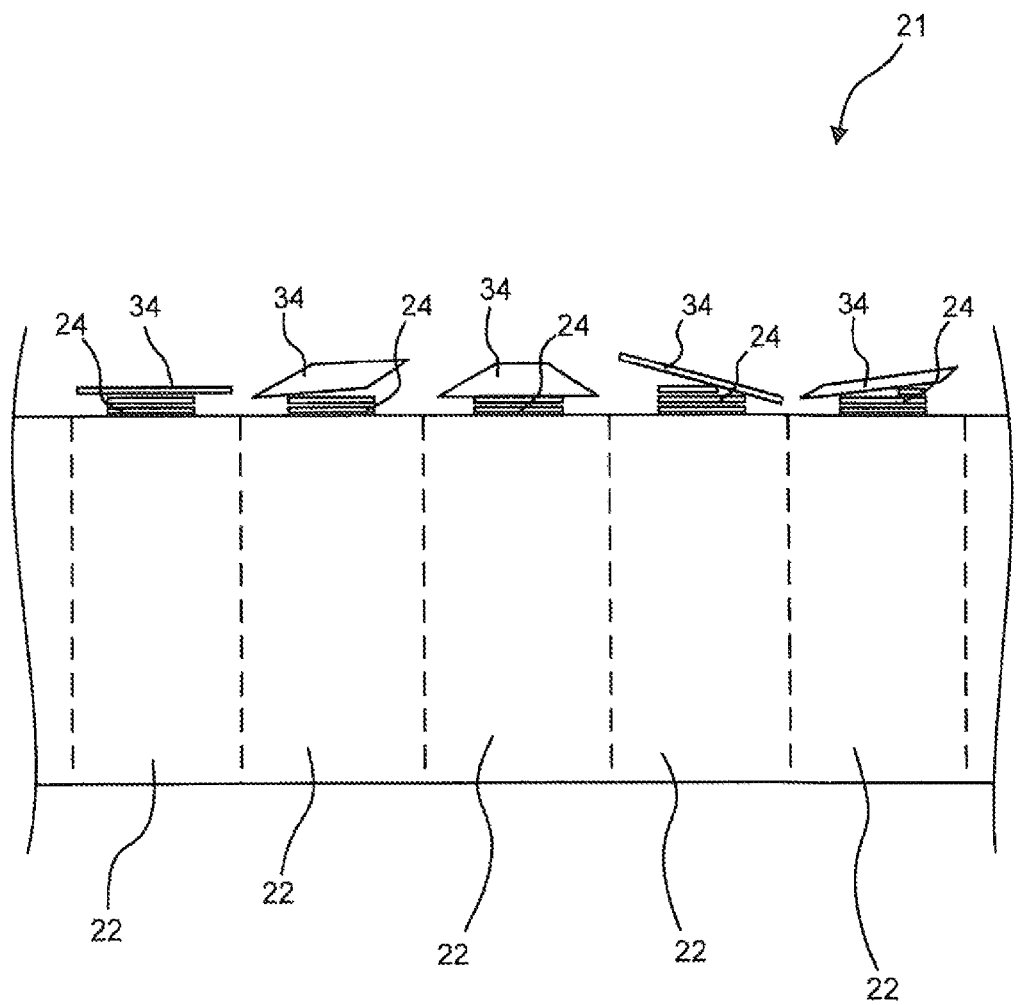
FIG. 3 is a partial front elevation view of a MEMS package of a lighting device according to the present invention.
Figure 4:
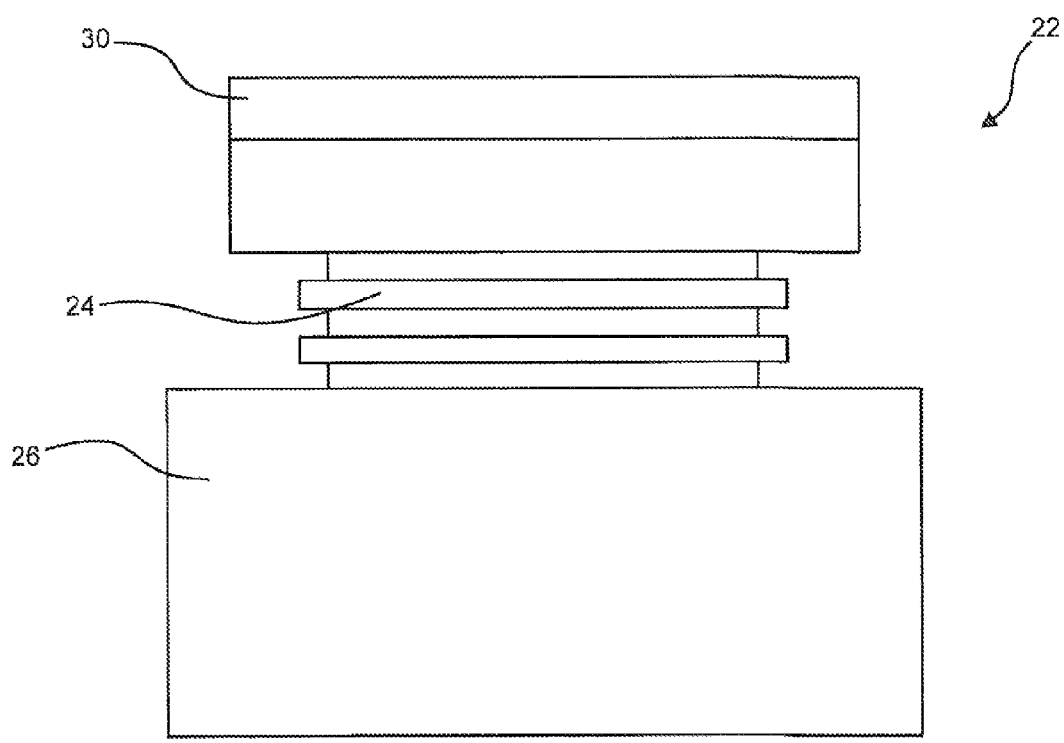
FIG. 4 is a front elevation view of a MEMS cell of a lighting device according to the present invention.
Figure 5:
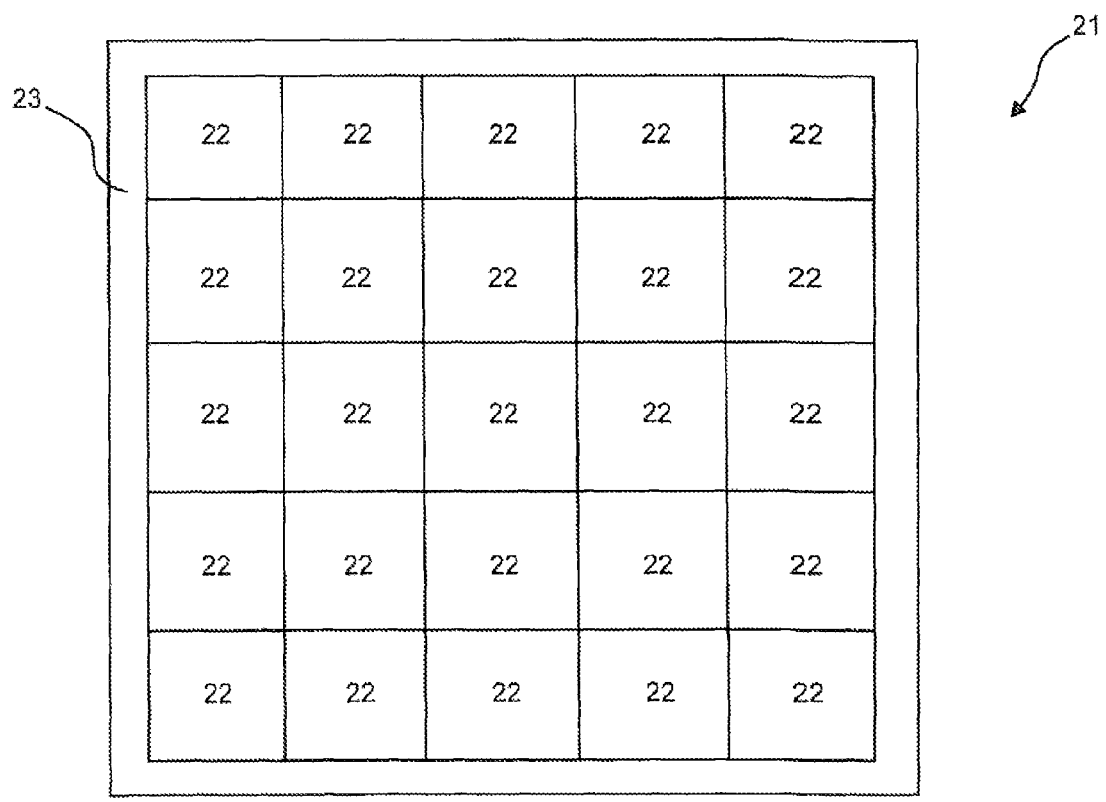
FIG. 5 is top plan view of the MEMS package of FIG. 3.

Referring now additionally to FIGS. 3-5, additional features of the lighting device 10 of the present invention are now discussed in greater detail. More specifically, the MEMS package 21 of the lighting device 10 will be discussed herein. A MEMS device 20 may include at least one MEMS cell 22, organized in an array on a MEMS package 21 (FIG. 3). The array of MEMS cells 22 may be located on a packaging semiconductor 23 (FIG. 5), thus creating the MEMS package 21.

Referring now additionally to FIG. 4, additional features of the lighting device 10 of the present invention are now discussed in greater detail. More specifically, the structural configuration of the MEMS cell 22, a plurality of which may be configured to create the MEMS package 21, will now be discussed. The MEMS cell 22 may include a MEMS cell base 26, positioning components 24, and a repositionable surface 34. The repositionable surface 34 may also be referred to as an operative surface throughout this disclosure and the accompanying claims. The repositionable surface 34 may include a reflective surface that may reflect light. In an embodiment of the present invention, the repositionable surface 34 may be a micromirror. However, a person of skill in the art will appreciate, after having the benefit of this disclosure, that any surface capable of accepting a source light 42 and redirecting that light in a desired output direction 60 would be included within the scope and spirit of the present invention.

The MEMS cell base 26 may be comprised of a semiconductor material from which the other components of the MEMS cell 22 are formed. The semiconductor material may include silicon, but a person of skill in the art will appreciate additional semiconductor materials that will be included within the scope and spirit of the present invention. Due to flexibility properties inherent to silicon, when on the microscopic scale, the mechanical components of a MEMS device 20 formed from silicon may be repositioned with minimal energy dissipation. Silicon also provides the benefit of minimal fatigue characteristics realized during mechanical operation. This minimal fatigue characteristic may advantageously provide trillions of mechanical operations before failure may occur. A person of skill in the art will appreciate additional materials that may be used to form the MEMS cell base 26, such as but not limited to, polymers and metals.

The MEMS cell base 26 may also include electronic components that control the operation of the mechanical components of the MEMS cell 22. The electronic components may include an electronic connection to the microcontroller 28. Through this connection, the MEMS cell 22 may receive operational instructions from the microcontroller 28 via a configuration signal. The electronic components of the MEMS cell base 26 may also include a SRAM bank, which may be used to apply an electrical charge to the mechanical components through bias voltages, which may further allow the repositionable surface 34 to be selectively positioned. The use of bias voltage to control the MEMS cells 22 may allow the lighting device 10 to advantageously manipulate the light reflected in the desired output direction 60 from each MEMS cell 22 in an array, such as a MEMS package 21, simultaneously. The use of a bias voltage may additionally allow the MEMS device 20 to operate under a low voltage requirement, beneficially providing efficient operation.

The positioning components 24 may be formed from the MEMS cell base 26 through the processes of creating a plurality of material layers, patterning the layers with photolithography, etching the patterned layers into the shapes of the mechanical components of the MEMS cell 22, and depositing the layers together. Each of the layers deposited within the creation of the mechanical components of each MEMS cell 22 may be of a thickness on the scale of micrometers to nanometers.

The positioning components 24 may be formed to provide the mechanical motion of the repositionable surface 34. In the preferred embodiment, the positioning components 24 may be configured to allow motion about two axes. However, a person of skill in the art will appreciate alternate embodiments that may provide pivotal motion about one or more axes.

The positioning components 24 of the MEMS cell 22 may include mechanical components of at least one support structure, a yoke structure, and a pair of electrodes to control the operation of the other mechanical structures and the position of the repositionable surface 34. As an electrical current is applied to the electrodes of the positioning components 24, an electrostatic force may cause the mechanical structure of additional positioning components 24 to be physically repositioned. This repositioning may be a rotation about an axis on which a mechanical positioning component is located. Upon receiving an electric current, the electrostatic force may cause the mechanical positioning component to be reoriented by a distance that may be measured on a scale of picometers. However, due to micrometer scale of each MEMS cell 22, and the components included therein, this degree of reorientation may beneficially provide an adequate range of motion necessary to allow the repositionable surface 34 a significant degree of mobility.

By providing a range of motion for the repositionable surface 34, the positioning components 24 may allow the MEMS cell 22 to reflect source light 42 in a desired output direction 60. This may be accomplished by modifying the angles at which the repositionable surface 34 has been rotated about one or more axes. This rotation may be provided by the positioning components 24. As the repositionable surface 34 is reoriented by the positioning components 24, the angle of reflection, which defines the direction of reflected light, may be altered.

This alteration to the angle of reflection may advantageously allow the MEMS cell 22 to redirect the source light 42 in a desired output direction 60. This desired output direction 60 may be determined by one or more control signals received by the microcontroller 28 of the MEMS device 20, which may control one or more MEMS cells 22.

In some embodiments of the lighting device 10 of the present invention, the MEMS device 20 may be a digital micromirror device, or DMD. A DMD is a type of MEMS device 20 that may include a plurality of micromirrors, or microscopic mirrors, arranged in a rectangular array. Due to the microscopic size of the micromirrors, a DMD may include several hundred thousand micromirrors, or more, in a single device. A person of skill in the art will appreciate that although a rectangular array has been depicted in the appended figures, a DMD device of the present invention may include micromirrors configured in an array of any shape and still remain functional to reflect a source light 42 in a desired output direction 60. As a result, such alternately configured arrays should be considered to be included within the scope and spirit of the present invention.

Although the following paragraphs describe the structure of the MEMS device 20 as a DMD, a person of skill in the art will appreciate the structural descriptions for the DMD may be applied to a MEMS device 20. In the following paragraphs, the micromirror of the DMD may be the structural equivalent of the repositionable surface 34 of the MEMS device 20. The micromirror may simply be an embodiment of the repositionable surface 34 wherein the surface is reflective. As such, skilled artisans should additionally regard the following paragraphs as a disclosure for MEMS based lighting devices 10 in general, and not restrict the disclosure solely to DMD devices.

The micromirrors of the DMD may be constructed of a reflective material, such as, but not limited to, aluminum. Each micromirror may be controlled by the positioning components 24 of the DMD. Considering that the DMD is a type of MEMS device 20, the DMD may share the structural configuration of the previously described MEMS device. Preferably, the micromirrors included in the DMD may be capable of being rotated approximately 12 degrees in either direction about an axis. A person of skill in the art will appreciate, after having the benefit of this disclosure, that a micromirror included in the DMD may be rotated more or less than 12 degrees and remain within the scope and spirit of the present invention.

This rotation of each micromirror may allow the respective micromirror to transition between an "on" state and an "off" state. The "on" state of a micromirror may be initiated when the micromirror is positioned to reflect light in the desired output direction 60. The "off" state of a micromirror may be initiated when the micromirror is positioned to reflect light in a direction other than the desired output direction 60. In embodiments, in the "off" state, the reflected light may be directed at a light absorbing member. An example of a light absorbing member may include, but should not be limited to, a heatsink.

Each of the micromirrors of the DMD array may correspond with a pixel of the light being outputted by the DMD. These pixels may be combined to create an image that may be displayed on a projection surface 62. The projection surface 62 will be discussed in further detail below. Through the manipulation of each micromirror, the image may be continually updated to display a desired color pattern or image in the desired output direction 60. Through the rapid positioning of each micromirror in the "on" or "off" states, the DMD may reflect or project an animated picture or video image in the desired output direction 60.

Throughout the remainder of this disclosure, the present invention will be discussed as a MEMS configuration, generally. A skilled artisan will appreciate that the structural configuration of a MEMS configuration is intended to include the structural configuration of a DMD, since the DMD is an application of MEMS technology. The MEMS cells 22 may be organized in a grid configuration, such as illustrated by FIG. 5. Various grid configurations may be used, which may include the non-limiting example of a square grid presented in FIG. 5. However, a person of skill in the art will appreciate that the MEMS cells 22 may be organized in any configuration on the MEMS package 21 that may allow the reflection of source light 42 in a desired output direction 60.

For clarity, the MEMS package 21 of FIG. 5 is presented as a version of a MEMS package 21, which may be included as part of the preferred embodiment of the MEMS device 20 of the present invention. In the preferred embodiment, an array of MEMS cells 22 may include any number of MEMS cells 22, and not necessarily the number of MEMS cells depicted in FIG. 5. Due to the microscopic nature of MEMS devices 20, the MEMS device may include MEMS cells 22 with measurements as small as 1 micrometer by 1 micrometer. A person of skill in the art will appreciate that, although the disclosure provided herein contemplates a MEMS device 20 with a plurality of MEMS cells 22, the present invention may include a MEMS device 20 with as little as one MEMS cell 22, and still be included within the scope and spirit of the present invention.

The repositionable surface 34 of the MEMS device 20 may include a conversion coating 30 applied to alter the source wavelength range of the source light 42 into a converted wavelength range of the converted light 46, which is perhaps best illustrated in FIG. 4. The conversion coating 30 is preferably provided by a phosphorous coating capable of converting a light with a source wavelength range into a light with one or more converted wavelength ranges. However, it will be appreciated by skilled artisans that any coating that may be capable of converting a light from one wavelength range to another wavelength range may be applied to the repositionable surface 34 and be included within the scope and spirit of the present invention.

A conversion coating 30, such as a coating based on a phosphorous material, may alter the wavelength range of light that may be transmitted through the coating. A source wavelength range may be converted into at least one converted wavelength range. As discussed above, a source light 42 may include a monochromatic, bichromatic, or polychromatic light emitted by one or more light sources 40. For the sake of clarity, references to a source light 42, and its corresponding source wavelength range, should be understood to include the light emitted by the one or more light sources 40 received by the MEMS device 20 of the lighting system 10. Correspondingly, a source wavelength range should be understood to be inclusive of the wavelength ranges included in monochromatic, bichromatic, and polychromatic source lights 42.

Additionally, a source light 42 with a source wavelength range may be converted by the conversion coating 30 into a converted light 46 with multiple converted wavelength ranges. The use of multiple phosphor elements may produce a light that includes multiple discrete or overlapping wavelength ranges. These wavelength ranges may be combined to produce the converted light 46. For further clarity in the foregoing description, references to a converted light 46, and its corresponding converted wavelength ranges, should be understood to include all wavelength ranges that may have been produced as the source light 42 may pass through the conversion coating 30.

A phosphor substance may be illuminated when it is energized. Energizing of the phosphor may occur upon exposure to light, such as the source light 42 emitted from the light source 40. The wavelength of light emitted by a phosphor may be dependent on the materials from which the phosphor is comprised.

In an embodiment of the lighting device according to the present invention, a plurality of conversion coatings 30 may be applied to the repositionable surfaces 34 of each MEMS cell 22. For example, a plurality of phosphors may be used that are capable of generating green, blue, and red converted light 46. When these conversion coatings 30 are applied to the repositionable surface 34 of the MEMS cell 22, the repositionable surface 34 may reflect light in the converted wavelength range of the corresponding conversion coating 30. For clarity, repositionable surfaces 34 coated with a green, blue, and red conversion coating 30 may be referred to in this disclosure, respectively, as a green repositionable surface 34G, blue repositionable surface 34B, and red repositionable surface 34R. This configuration of colored MEMS cells 22 in a MEMS package 21 may perhaps be best illustrated in FIGS. 6A and 10.

Figure 6A:
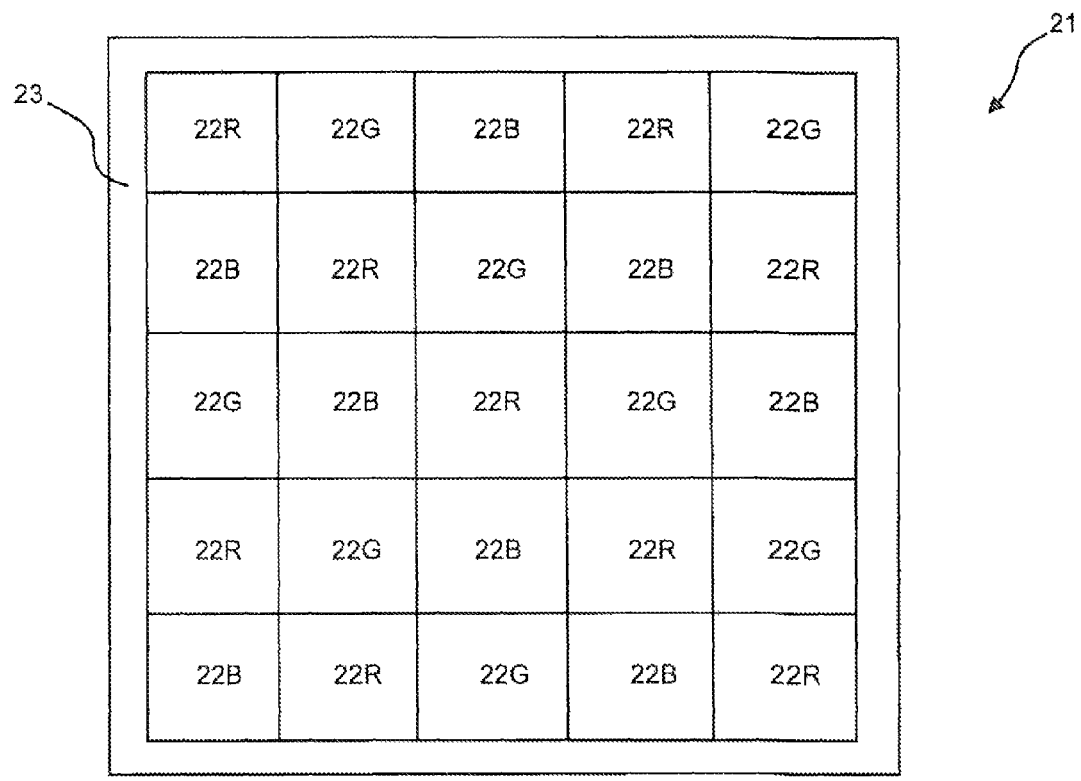
FIGS. 6A and 6B are top plan views of embodiments of the MEMS package illustrated in FIG. 5.
Figure 10:
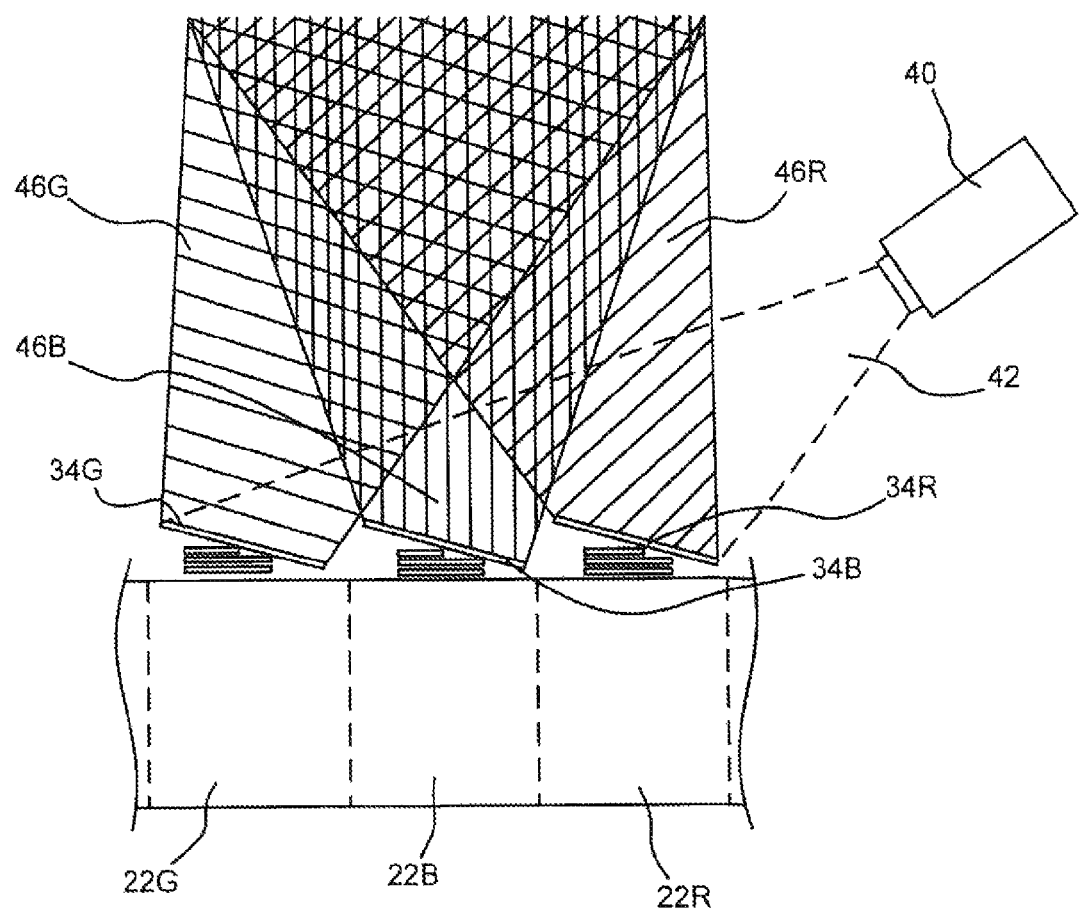
FIG. 10 is a partial side elevation view of the MEMS package illustrated in FIG. 3.

Referring now to FIG. 6A and FIG. 10, the conversion coated repositionable surfaces 34G, 34B, and 34R (illustrated in FIG. 10) may be evenly distributed. This even distribution may result in the uniform reflection of converted light 46, since the green repositionable surface 34G, blue repositionable surface 34B, and red repositionable surface 34R may occupy approximately the same proportional area of the packaging semiconductor 23. A person of skill in the art will appreciate that a non-uniform distribution of the proportional area occupied by the green repositionable surface 34G, blue repositionable surface 34B, and red repositionable surface 34R are to be included in this disclosure, as such configuration may be demanded by the desired application of the lighting device 10.

A person of skill in the art, after having the benefit of this disclosure, will appreciate that conversion coatings 30 that produce light in a wavelength range other than green, blue, and red may be applied to the repositionable surfaces 34 of the MEMS cells 22 and therefore be included within the scope and spirit of the present invention. A skill artisan will additionally realize that any number of conversion coatings 30, which may be capable of producing converted light 46 of various converted wavelength ranges and corresponding colors, may be applied to the repositionable surfaces 34 of the MEMS cells 22 and still be included within the scope of this disclosure.

The preceding example, depicting three discrete color conversion coatings 30, is not intended to be limiting in any way. Instead, the description for the preceding example has been provided for illustrative purposes, solely as a non-limiting example. A skilled artisan will appreciate that any wavelength range, and therefore any corresponding color, may be produced by a conversion coating 30 applied to a repositionable surface 30 and remain within the scope of the present invention. Thus, the lighting device 10 of the present invention should not in any way be limited by the preceding example.

Figure 6B:
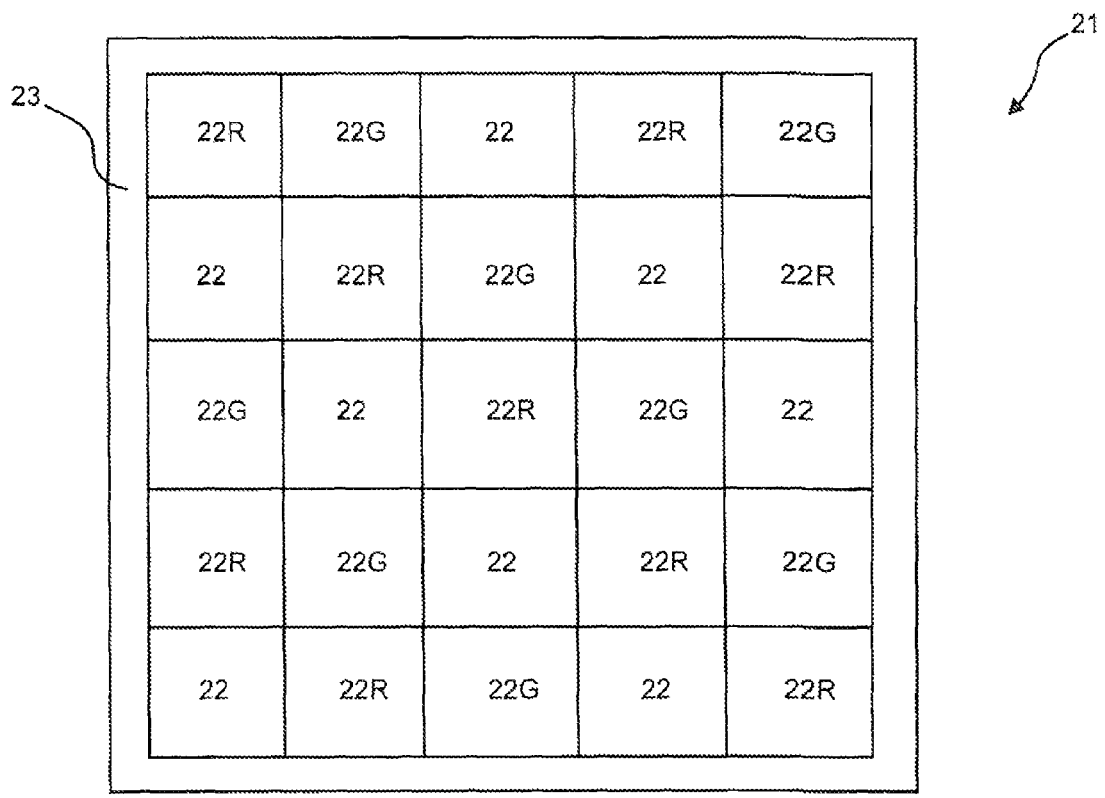

As perhaps best illustrated in FIG. 6B, an additional embodiment of the MEMS device 20 of the lighting device 10 according to the present invention may receive a blue source light 42. More specifically, a MEMS device 20 may include a plurality of MEMS cells 22, wherein a number of MEMS cells 22 may not have a conversion coating 30 applied to its repositionable surface 34. The lack of an application of a conversion coating 30 may allow the respective repositionable surface 34 to reflect the source light 42 as it is received by the MEMS cell 22. Additional desired colors may be provided by applying a conversion coating 30 to the repositionable surfaces 34 of the remaining corresponding MEMS cells 22.

A non-limiting example of the embodiment of the preceding paragraph is presented below, wherein the source light 42 is within a blue wavelength range. Since the source light 42 is already emitted in a blue wavelength range, no conversion may be required to reflect a blue light in the desired output direction 60. Conversely, since the source light 42 is emitted as a blue light, a conversion coating 30 may be applied to the repositionable surfaces 34G and 34R of a proportional number of MEMS cells 22G and 22R to convert the source light 42 into a converted light 46 with the desired converted wavelength range. Referring to the example depicted in FIG. 6B, areas of green repositionable surfaces 34G, red repositionable surfaces 34R, and repositionable surfaces 34 with no application of a conversion coating 30 may be distributed to occupy approximately the same proportional area. As a blue source light 42 is received by the MEMS device 20, the MEMS device 20 may thus reflect a converted light 46 that include a light in the green wavelength range, blue wavelength range, and red wavelength range.

A person of skill in the art will appreciate, after having the benefit of this disclosure, that a source light 42 with any source wavelength range may be received by the MEMS device 20 and converted into a converted wavelength range. The embodiment illustrated by FIG. 6B may also receive a source light 42 in the red wavelength range and include areas of green repositionable surfaces 34G, blue repositionable surfaces 34B, and repositionable surfaces 34 with no application of a conversion coating 30.

Figure 7:
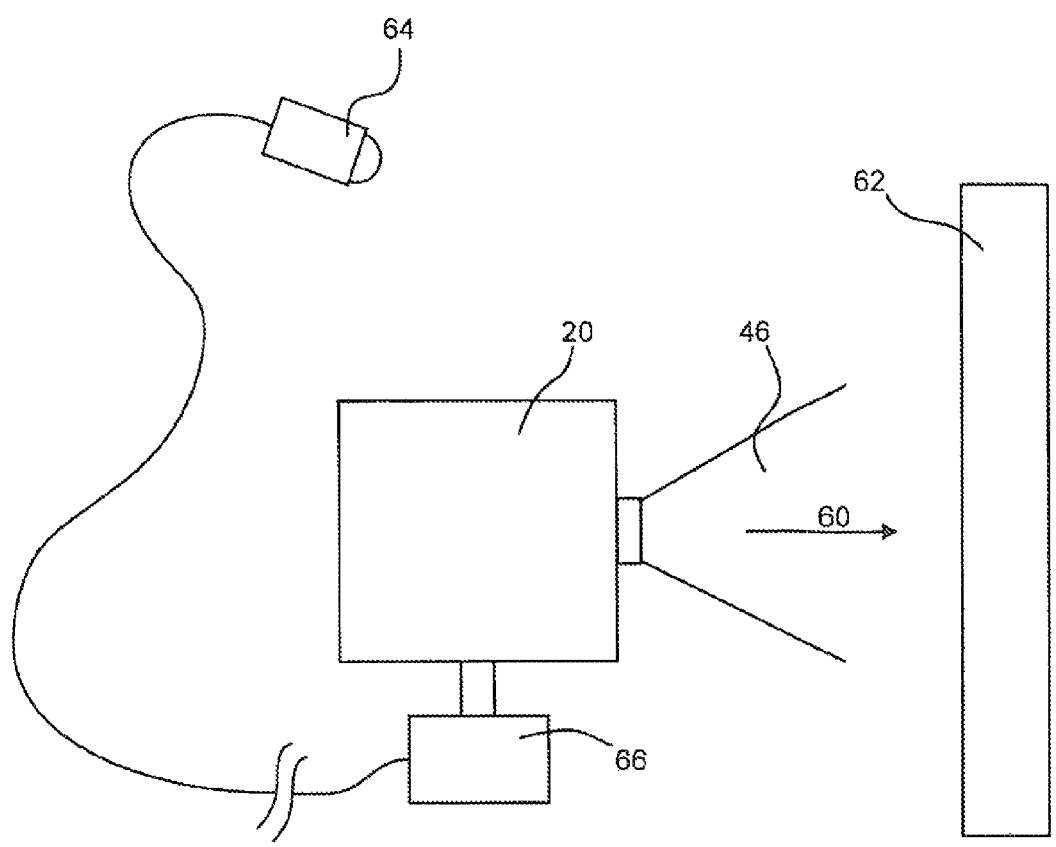
FIG. 7 is a partial side elevation view of a position detecting device, repositioning device, and projection surface of the lighting device according to the present invention.

Referring now to FIG. 7, additional features of the lighting device 10 according to an embodiment of the present invention are now described in greater detail. More specifically, the desire output direction 60 of the converted light 46 will now be discussed. After a source light 42 has been converted by the MEMS device 20 into a converted light 46, it may be reflected in a desired output direction 60. The lighting device 10 of the present invention may reflect the converted light 46 generally in the desired output direction 60 wherein the reflected light may diffuse into a volume, such as a room or stage. The converted light 46 reflected by the lighting device 10 may thus illuminate the volume.

Alternately, the converted light 46 may be reflected such that the desired output direction 60 may include a projection surface 62. In some embodiments, the projection surface 62 may be an area spatially located in the desired output direction 60, such as, but not to be limited to, a wall or screen. In other embodiments, the projection surface 62 may be an object intended to receive the converted light reflected by the MEMS device.

Since the lighting device 10 of the present invention may include a MEMS device 20 with conversion coatings 30 applied directly to the repositionable surfaces 34 of each MEMS cell 22, the lighting device 10 of the present invention may advantageously project a dynamic image on an irregular projection surface 62 using a minimal number of movable parts. The operation of the lighting device 10 of the present invention will be discussed in greater detail below.

Figure 7A:
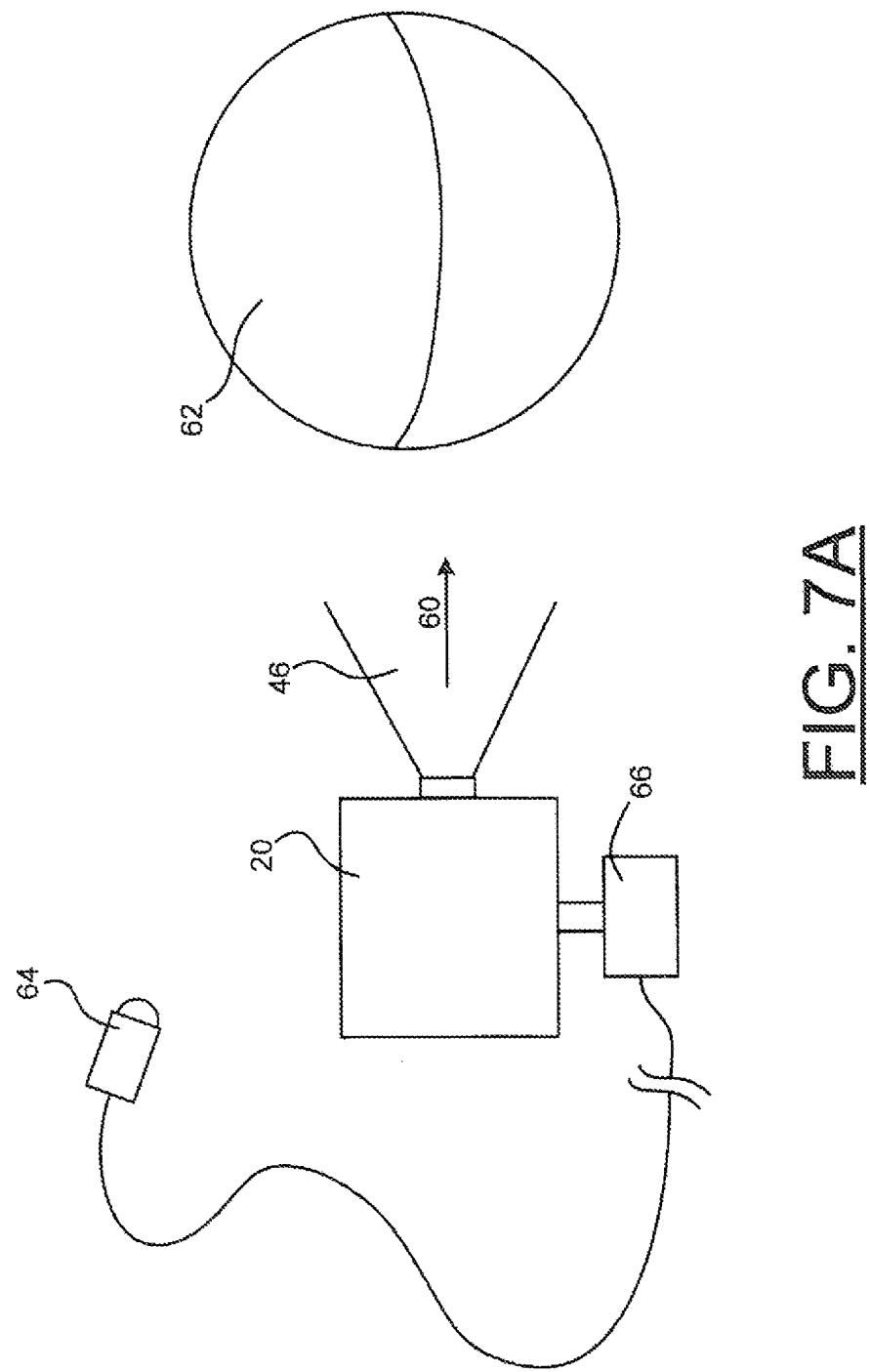
FIGS. 7A, 7B, and 7C are partial side elevation views of the lighting device illustrated in FIG. 7 reflecting converted light on various projection surfaces.

A projection surface 62 may include any surface of an object on which light may be projected. In addition to defining a projection surface 62 as a wall or screen, as described above, the projection surface 62 may include objects that do not have rectangular or regular shape. As perhaps best illustrated in FIG. 7A, the projection surface 62 may also include a sculpture, or other non rectangular object. As illustrated in the example provided in FIG. 7A, wherein a spherical structure is illustrated, the converted light 46 may be reflected by the MEMS device 20 on the spherical projection surface 62.

Figure 7B:
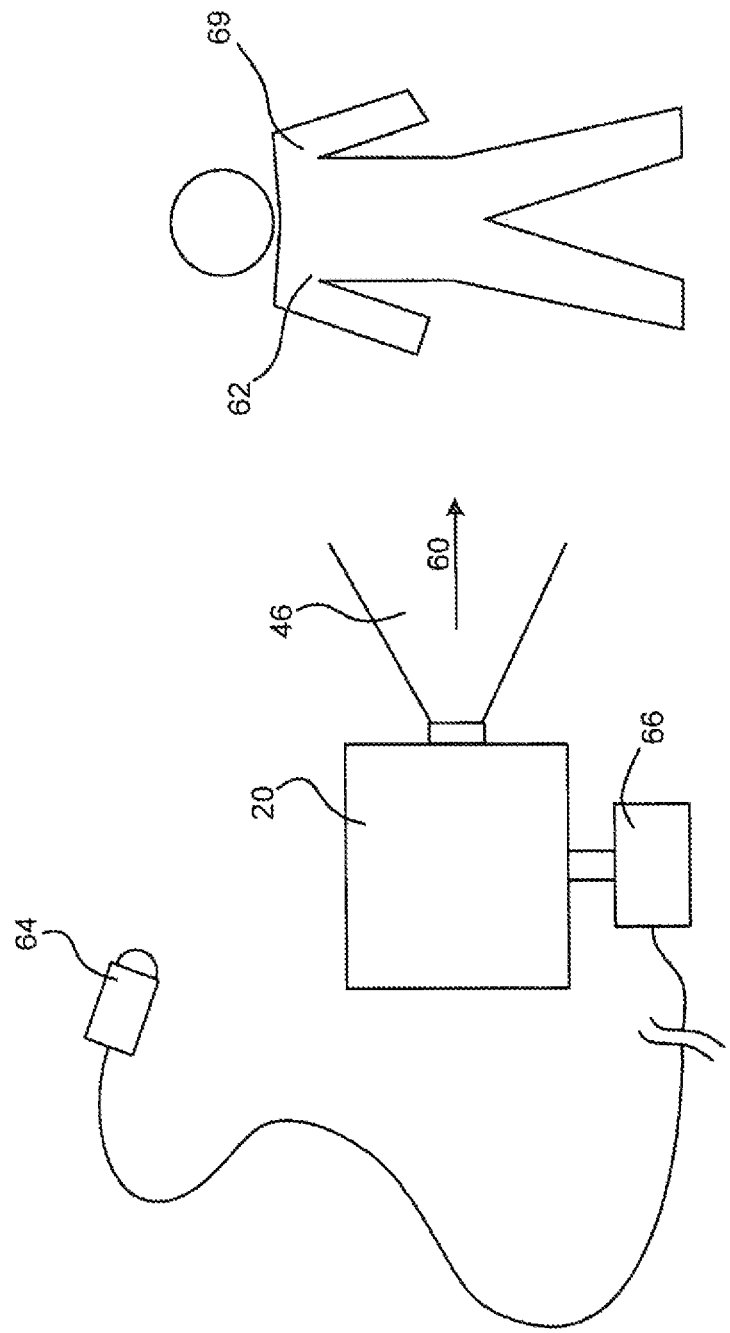
Figure 7C:
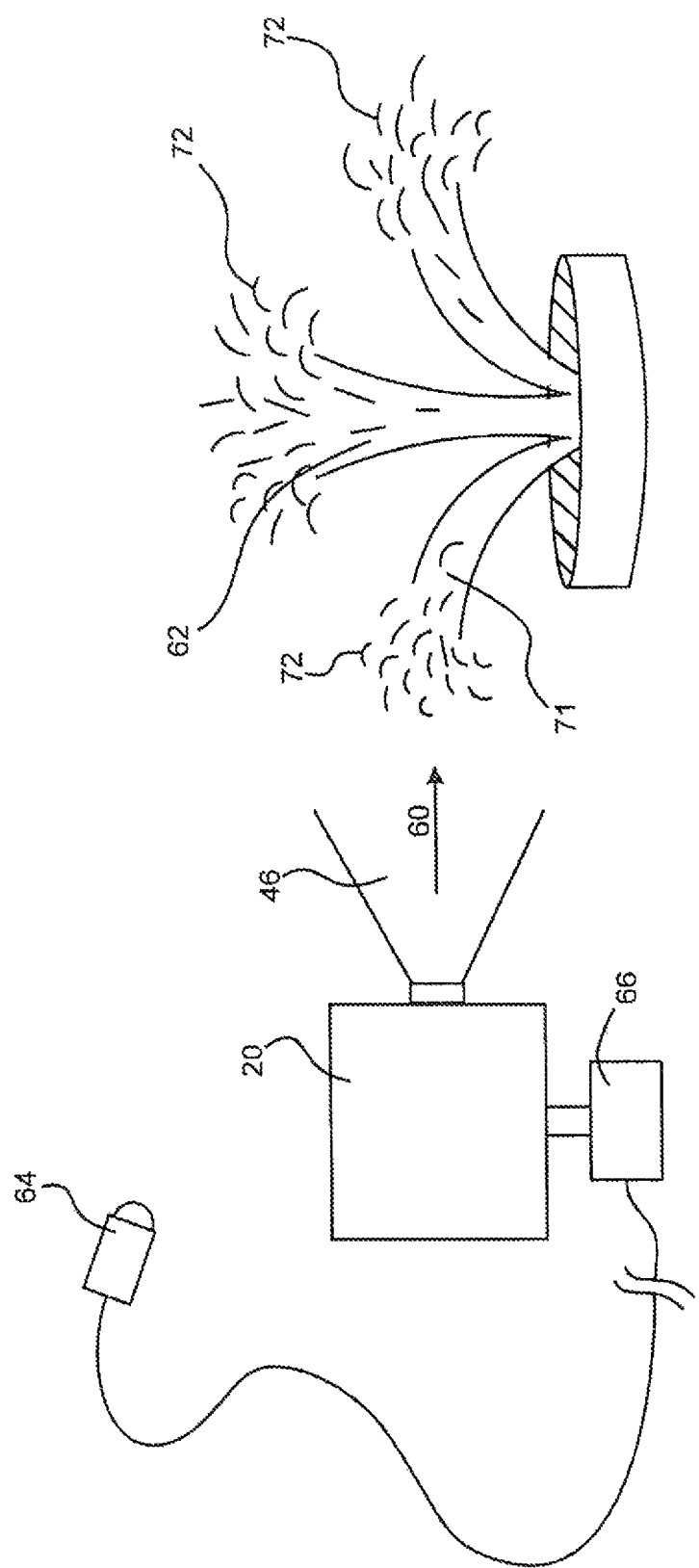

A projection surface 62 may additionally include any surface of a non-stationary object, or an object that may that may reposition itself or be repositioned, as perhaps best described in the examples illustrated in FIGS. 7B and 7C. In the example illustrated in FIG. 7B, the projection surface 62 may be a person. The projection surface 62 may also be an object with random movement characteristics, such as the water fountain that is depicted for exemplary purposes in FIG. 7C.

The lighting device 10 may be able to track the movement of a person, water fountain, or other projection surface 62 via a position detecting device 64. A person of skill in the art will appreciate that the previous examples of a sculpture, person, and water fountain have been provided only as examples, and are not intended to be limiting in any way. A skilled artisan will also appreciate that any object, whether stationary or moving, may be used as a projection surface 62 within the scope of the present invention.

A position detecting device 64 may be used to determine the spatial location of the projection surface 62. Embodiments of the position detecting device 64 may use one or more configurations of position sensing components to determine the location of the projection surface 62. A person of skill in the art will appreciate that a position detecting device 64 may be configured to control one or more MEMS device 20.

Examples of possible position sensing configurations will now be discussed. The position detecting device 64 may use at least one camera to determine the location of the projection surface 62. Two or more cameras may be used to determine the distance between the projection surface 62 and the lighting device 10 of the present invention. In an embodiment of the present invention, the cameras of the position detecting device 64 may be positioned at equivalent distance apart from each other, which may allow the position detecting device 64 to determine depth. The position detecting device 64 may then determine the distance between the projection surface 62 and the position detecting device 64 by calculating a depth algorithm.

The position detecting device 64 may use alternate or additional position detecting configurations. These position detecting configurations may include, but should not be limited to, radar, sonar, infrared, RFID, laser targeting, and other position detecting mechanisms that should be apparent to a person of skill in the art.

Once the position detecting device 64 has determined the location of the projection surface 62, it may create a position output denoting the location of the projection surface 62. The position output may be received by any device capable of interpreting the signal included therein, such as the MEMS device 20 and/or a repositioning device 66.

If the position output is received by the MEMS device 20, the MEMS device 20 may control the MEMS cells 22 included therein to reflect the converted light 46 in a desired output direction 60 that corresponds with the detected location of the projection surface 62. As the projection surface 62 may reposition itself or be moved, the position detecting device 64 may detect the new position of the projection surface 62. The position detecting device 64 may then output a new position signal, which may be received by the MEMS device 20. As a result, the MEMS device 20 may reorient the desired output direction 60 of the converted light 46 to correspond to the present location of the projection surface 62. This operation may occur continually.

Referring back to the water fountain example, as illustrated in FIG. 7C, the projection surface 62 may include a plurality of smaller surfaces. In the present example, these smaller surfaces may include streams 71 and droplets 72 generated by the fountain. Furthermore, this plurality of smaller surfaces may be scattered about a given area, spatially existing at various positions and depths from each other.

After locating each smaller surface, which may collectively comprise the projection surface 62, the MEMS device 20 may adapt the desired output direction 60 to reflect the converted light 46 to approximately the same areas occupied by the smaller surfaces of the projection surface 62. A more detailed example of this operation will be provided below.

Referring now to FIGS. 7, 7A, 7B, and 7C, the position detecting device 64 may transmit the position signal to a repositioning device 66. The repositioning device 66 may be operatively connected to the MEMS device 20 to provide physical reorientation of the MEMS device 20. This physical reorientation may advantageously allow the MEMS device 20 to reflect converted light 46 to an extended area that would otherwise be outside of the range of a stationary MEMS device 20.

The repositioning device 66 may include motorized components capable of repositioning the MEMS device 20 in relation to a received input. The received input may be a position input received by the position detecting device 64. Upon receiving the input, the repositioning device 66 may control at least one motorized component to rotate the physical position of the MEMS device 20. A person of skill in the art will appreciate that although this disclosure discusses the use of motorized components to physically adjust or alter the orientation of the MEMS device 20, alternate repositioning structures may be used. Such structures may include, but should not be limited to, electromagnetic systems, pneumatics, hydraulics, and other position manipulating systems that would be appreciated by a person of skill in the art.

In another embodiment, the repositioning device 66 may manipulate a light redirecting structure other than the MEMS device 20. This structure may be a mirror, configured to receive and redirect the converted light 46 reflected by the MEMS device 20 via a second reflection. The light directing structure may also be a lens, configured to redirect the light that may pass through it. Yet another example of a light directing structure may be a waveguide. A skilled artisan will appreciate additional equivalent light redirecting structures that may be controlled by a repositioning device 66, which may alter the path of the light reflected by the MEMS device 20, that are intended be included within the scope and spirit of the present invention. The position detecting device 64 and the repositioning device 66 may be integrated into one structure. Alternately, the position detecting device 64, repositioning device 66, and MEMS device 20 may all be integrated into one structure.

In operation, the lighting device 10 of the present invention may advantageously convert and redirect the wavelength range of a source light 42 in one operation. More specifically, the lighting device 10 of the present invention may receive a source light 42, convert the source wavelength range of the source light 42 into a converted wavelength range of a converted light 46, and reflect the converted light 46 in a desired output direction 60. A projection surface 62 may be included in the desired output direction 60. The spatial position of the projection surface 62 may be detected by a position detecting device 64, from which a repositioning device 66 may reorient a MEMS device 20 to allow the desired output direction 60 to correspond with the location of the projection surface 62.

The source light 42 may be generated by one or more light sources 40. The light source 40 may include at least one light generating element, as previously discussed, which may include LEDs, lasers, and/or other light emitting semiconductors. A skilled artisan will appreciate that although the light source 40 is described as using a light emitting semiconductor, any light generating structure may be used and remain within the scope and spirit of the present invention.

An LED may emit light when an electrical current is passed through the diode in the forward bias. The LED may be driven by the electrons of the passing electrical current to provide an electroluminescence, or emission of light. The color of the emitted light may be determined by the materials used in the construction of the light emitting semiconductor. The foregoing description contemplates the use of semiconductors that may emit a light in the blue or ultraviolet wavelength range. However, a person of skill in the art will appreciate that light may be emitted by light emitting semiconductors of any wavelength range and remain within the breadth of the invention as disclosed herein. Effectively, a light emitting semiconductor may emit a source light 42 in any wavelength range, since the emitted source light 42 may be subsequently converted by a conversion coating 30 applied to repositionable surface 34 of the MEMS cells 22 as it is reflected in the desired output direction 60.

Figure 8:
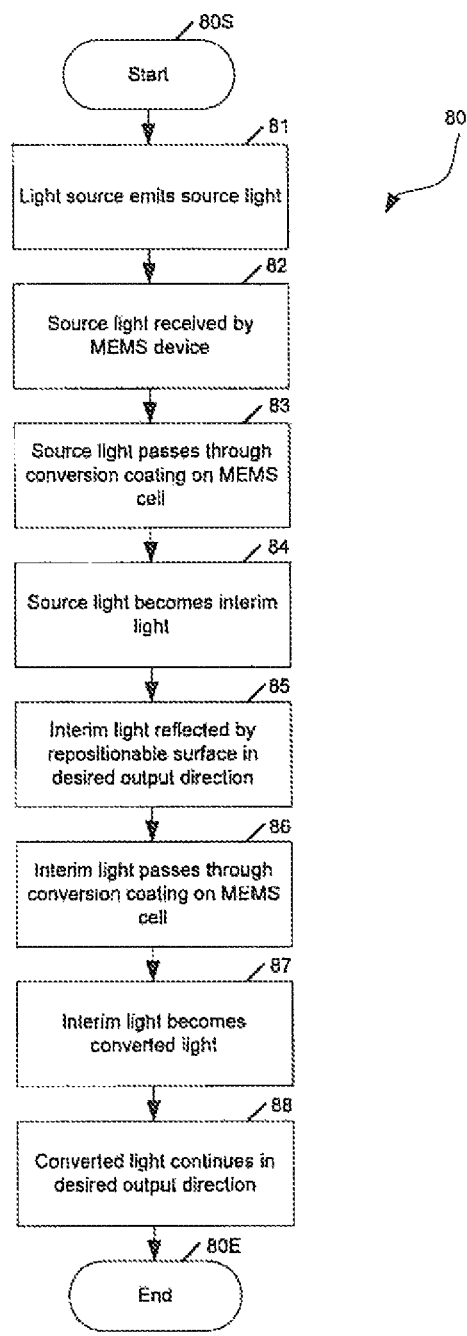
FIG. 8 is a flowchart detailing transmission, conversion, and reflection of light in accordance a method aspect of the present invention.

Referring now additionally to flowchart 80 illustrated in FIG. 8, the transmission, conversion, and reflection of light resulting from the operation of the lighting device 10 of the present invention will now be discussed in greater detail. Starting at Block 80S, the light source 40 may emit a source light 42 (Block 81). The emitted source light 42 may then be directed to the MEMS device 20, resulting in the source light 42 being received by the MEMS device 20 (Block 82). Next, the source light 42 may pass though the conversion coating 30 applied to the repositionable surface 34 of the MEMS cell 22 (Block 83). As the source light 42 passes through the conversion coating 30, the source light 42 may undergo a first wavelength conversion into an interim light (Block 84).

The interim light may then be reflected by the repositionable surface 34 of the MEMS cell 22 in the desired output direction 60 (Block 85). As previously discussed, the repositionable surface 34 may be a micromirror or other reflective, repositionable surface 34. After being reflected, the interim light may again pass through the conversion coating 30 applied to the repositionable surface 34 of the MEMS cell (Block 86).

The light may pass through the conversion coating 30 twice because the conversion coating 30 may be applied to the surface of the repositionable surface 34. By passing through the conversion coating 30 twice, the lighting device 10 of the present invention may advantageously require the application of less conversion coating 30 materials to the repositionable surface 34 of the MEMS cell 22. This beneficially reduces the additional mass that may be repositioned by the mechanical components of the MEMS cell 22, providing increased reliability and efficiency.

As the interim light passes through the conversion coating 30, the light may undergo a subsequent wavelength conversion into a converted light 46 (Block 87). The converted light 46 may then continue to travel in the desired output direction 60, to which it may have been reflected by the MEMS device 20 (Block 88). The operation may then terminate (Block 80E).

Figure 9:
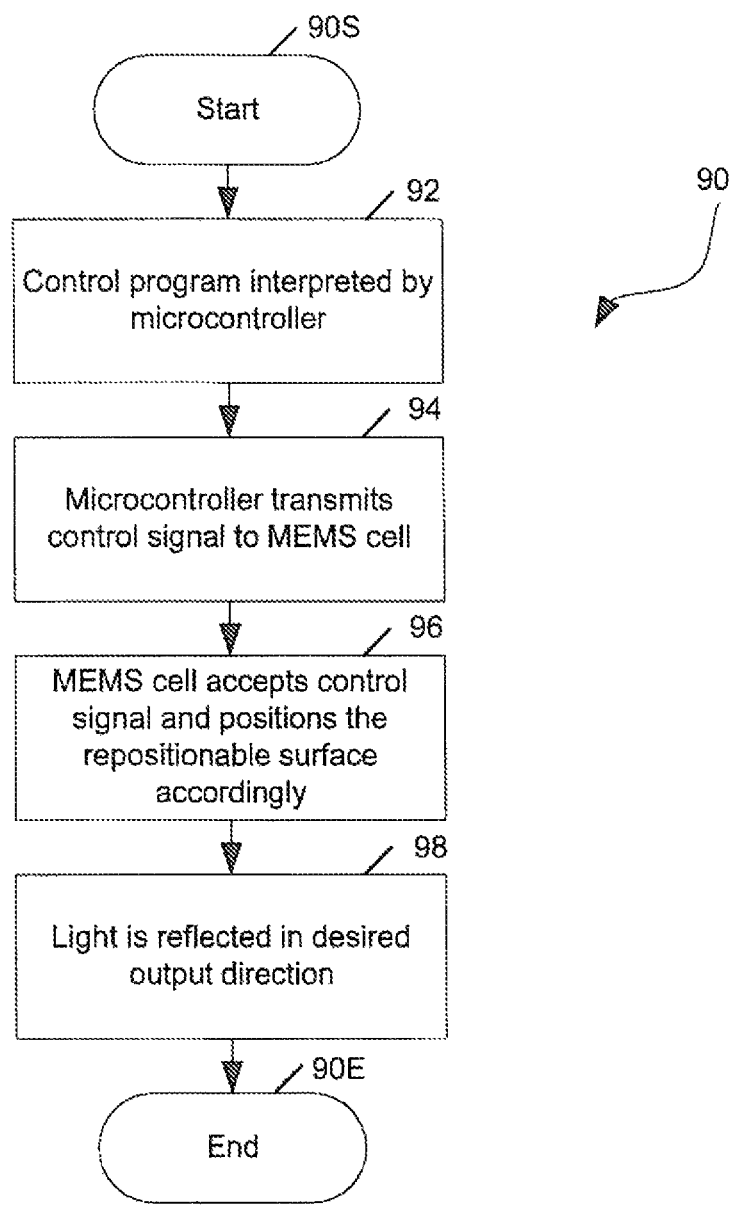
FIG. 9 is a flowchart detailing operation of controlling a desired output direction of converted light in accordance with a method aspect of the present invention.

Referring now additionally to the flowchart 90 illustrated in FIG. 9, the operation of controlling the desired output direction 60 of the converted light 46 will now be discussed in greater detail. The operation starts at Block 90S, wherein a control program is interpreted by the microcontroller 28 of the MEMS device 20 (Block 92). The control program may include a predetermined set of instructions included in a memory or data storage device. Alternately, the control program may be responsive to a set of user inputs, dynamically controlling the wavelength range of the converted light 46 in response to a user input. A person of skill in the art, after having the benefit of this disclosure, will appreciate equivalent schemes by which the microcontroller 28 may interpret a control program and operate the MEMS cells 22 of the MEMS device 20.

Once the microcontroller 28 has interpreted the instructions of the control program, the microcontroller 28 may transmit a control signal to the MEMS cells 22 (Block 94). The MEMS cell 22 may then accept the control signal and reposition its repositionable surface 34 accordingly (Block 96). The MEMS cell 22 may position the repositionable surface 34 to have an intended angle of reflection. Once the repositionable surface 34 has been properly positioned, light received by the MEMS cell 22 may be reflected in the desired output direction 60 (Block 98). The operation may then terminate (Block 90E).

Figure 11:
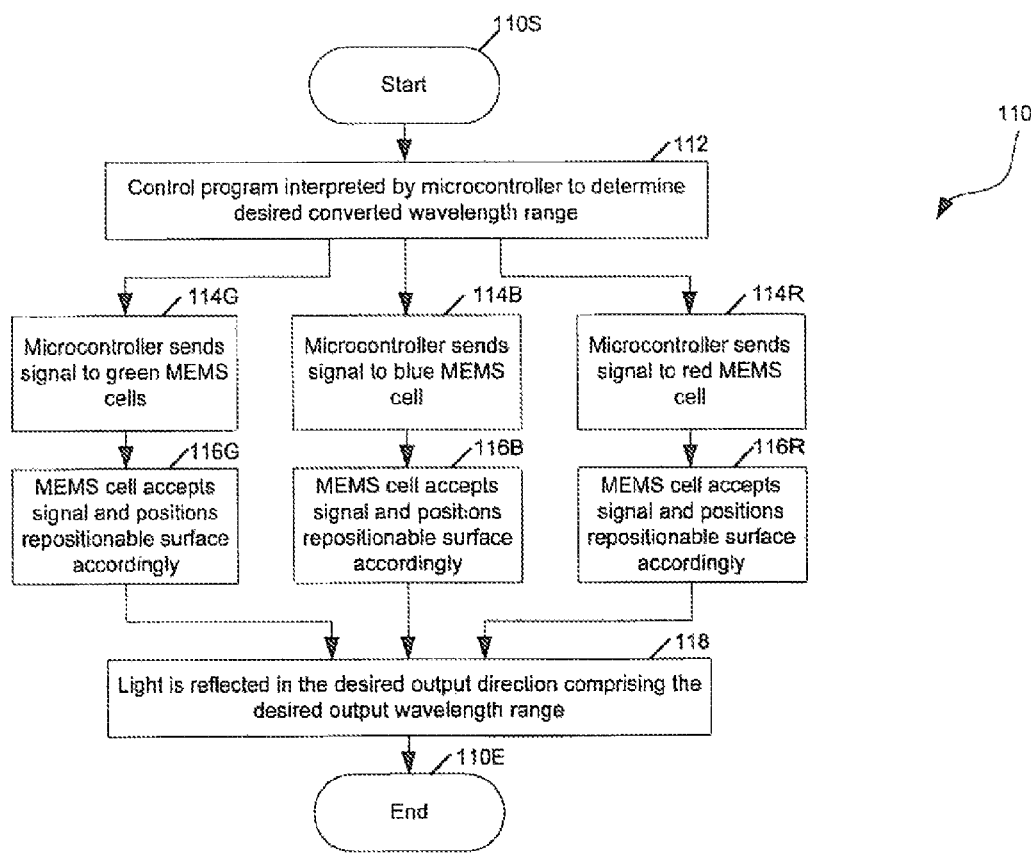
FIG. 11 is a flowchart detailing transmission, conversion, and reflection of light using the MEMS package illustrated in FIG. 10.

Referring now additionally to FIGS. 10 and 11, the operation of reflecting the converted light 46 in the desired output direction 60 in accordance with an embodiment of the present invention, will now be discussed in greater detail. More specifically, an embodiment wherein the source light 42 may be converted into a converted light 46 that may include various converted wavelength ranges will now be discussed.

FIG. 10 illustrates an array of MEMS cells 22 grouped in a MEMS package 21. For clarity, only three MEMS cells 22 have been illustrated therein, but a person of skill in the art will appreciate that any number of MEMS cells 22 may be included in the MEMS package 21. Similarly, FIG. 10 illustrates an array of MEMS cells 22 that may emit a converted light 46 in varying converted wavelength ranges. These MEMS cells 22 may include a green MEMS cell 22G, blue MEMS cell 22B, and red MEMS cell 22R. These MEMS cells 22 may respectively emit a converted light 46 that includes three different wavelength ranges, a green converted light 46G, a blue converted light 46B, and a red converted light 46R. These wavelength ranges of converted light 46 may be collectively reflected as one converted light 46, with a converted wavelength range, as previously discussed. A person of skill in the art will appreciate that, through the application of conversion coatings 30 with the appropriate wavelength converting materials, such as phosphors, a converted light 46 may be created with virtually any converted wavelength range. As such, the example provided herein is not intended to be limited in any way, and particularly not limited to the green converted light 46G, blue converted light 46B, and red converted light 46R described herein.

Referring now to the flowchart 110 illustrated in FIG. 11, the operation of the MEMS device 20 of the present embodiment, which may reflect a converted light 46 with varying converted wavelength ranges, is now described in greater detail. Starting at Block 110S, the control program may be interpreted by the microcontroller 28 to determine the desired converted wavelength range (Block 112).

The MEMS device 20 may include a green MEMS cell 22G, a blue MEMS cell 22B, and a red MEMS cell 22R. The microcontroller 28 may determine the amount of converted light 46 that may be reflected in the desired output direction 60 for each converted wavelength range by directing a proportion of the correspondingly colored MEMS cells 22 to reflect the converted light 46 in the desired output direction 60. Alternately, the microcontroller 28 may control the duty cycles of the MEMS cells 22 to alter the amount of light actually emitted in the desired output direction 60. Duty cycle control may be selectively applied to MEMS cells 22 of a corresponding wavelength range or color to alter the amount of light actually reflected in the desired output direction 60 for each wavelength range or color. In embodiments of the lighting device 10 of the present invention where the microcontroller 28 may control the duty cycles of the color MEMS cells 22, such as the green MEMS cells 22G, blue MEMS cells 22B, and red MEMS cells 22R, the microcontroller 28 may control all MEMS cells 22 of a similar color with one control signal. Alternately, the microcontroller 28 may control the MEMS cells 22 individually, regardless of the wavelength conversion coating 30 applied to the repositionable surface 34 thereof. A person of skill in the art, after having the benefit of this disclosure, will appreciate equivalent control configuration that are within the scope and spirit of the present invention.

The microcontroller 28 may control the intensity of each wavelength range or color by positioning a corresponding portion of the MEMS cells 22 in the desired output direction 60. To control the MEMS cells 22, the microcontroller 28 may send a control signal to the corresponding MEMS cells 22, which may include the green MEMS cell 22G (Block 114G), blue MEMS cell 22B (Block 114B), and red MEMS cell 22R (Block 114R). The respective MEMS cells 22 may then accept the control signal and position its respective repositionable surface 34 accordingly (Blocks 116G, 116B, and 116R). Once the respective MEMS cells 22G, 22B, and 22R have been positioned accordingly, the light may be reflected in the desired output direction 60, comprising the desired output wavelength range (Block 118). Thereafter, the operation may terminate (Block 110E).

Figure 12:
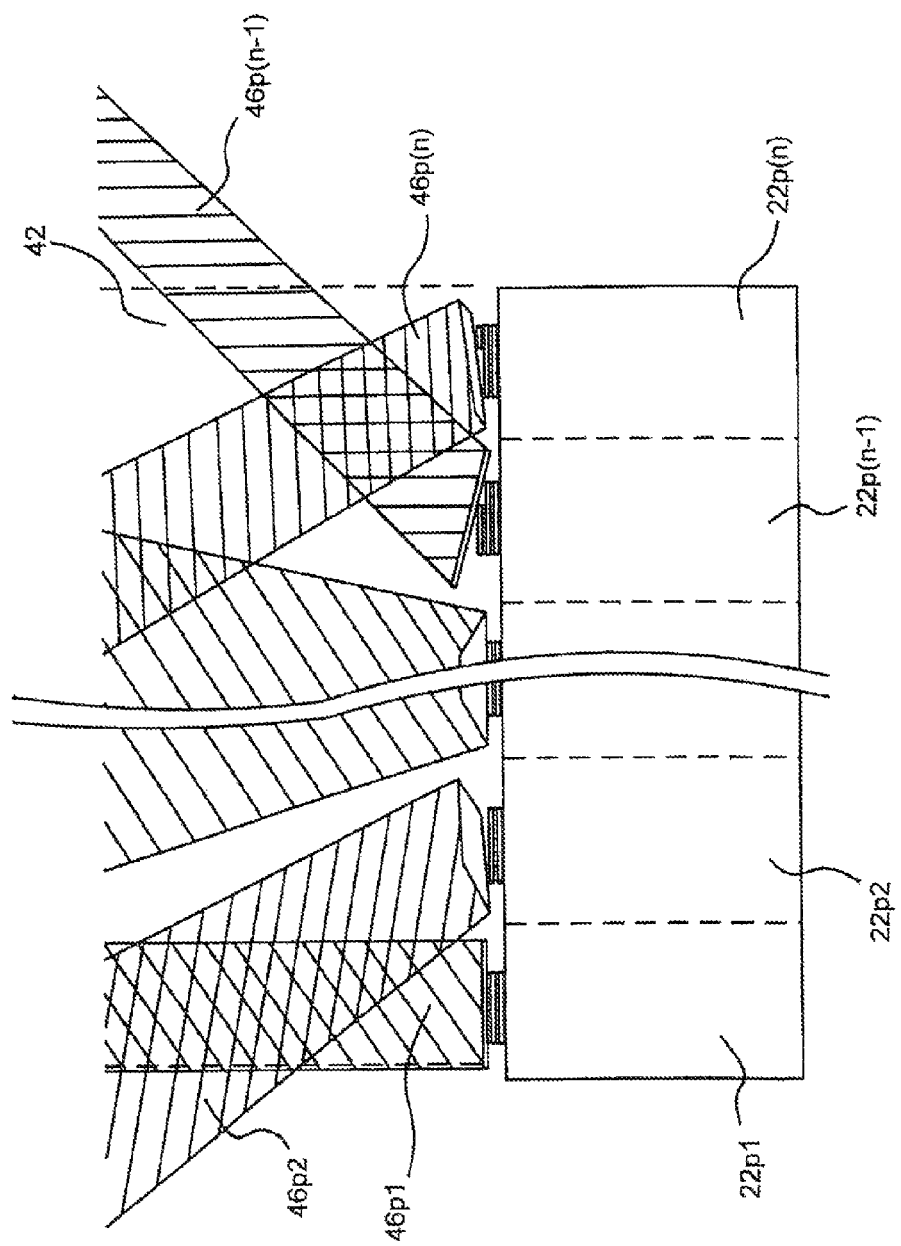
FIG. 12 is a partial side elevation view of the MEMS package illustrated in FIG. 3.
Figure 13:
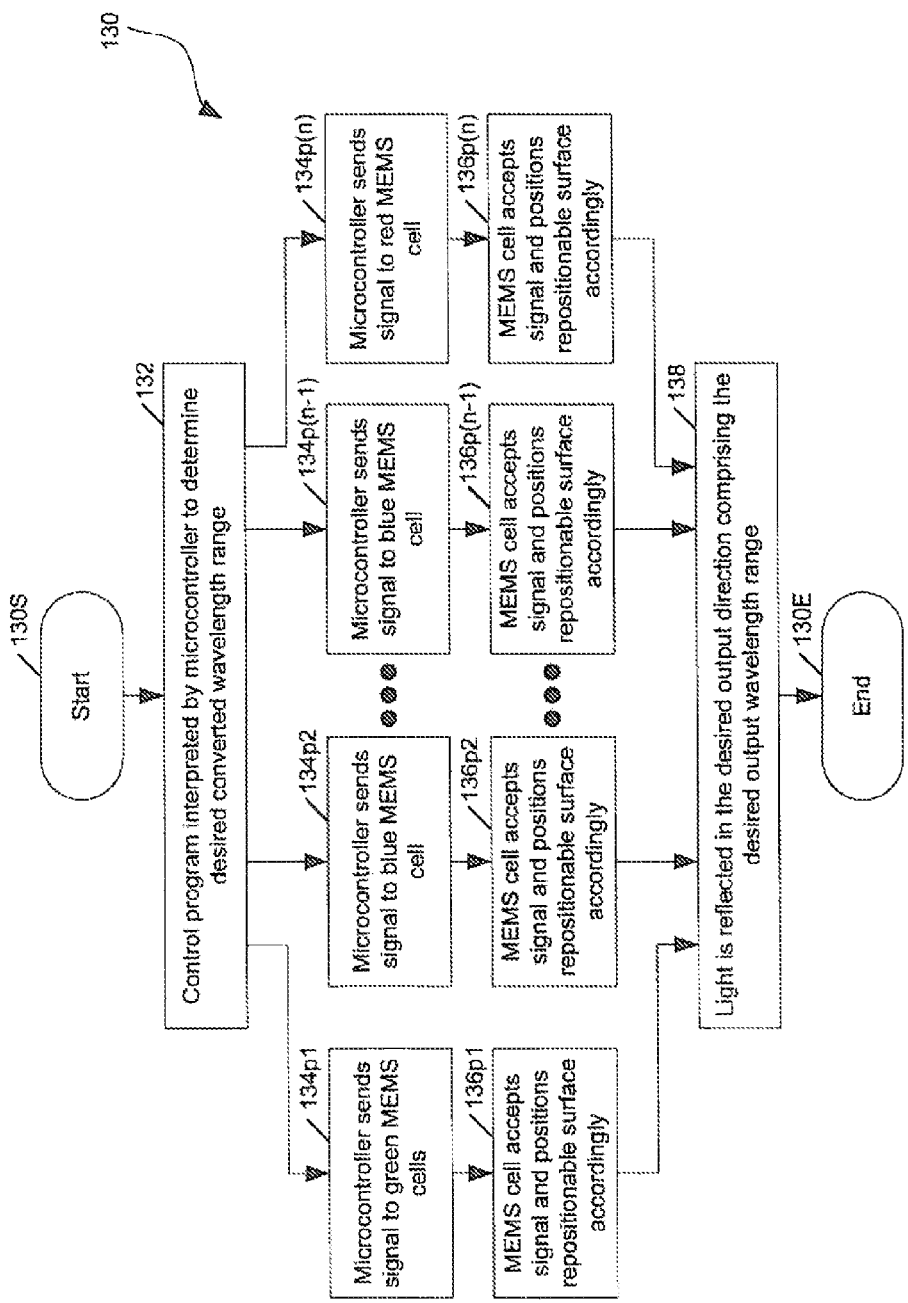
FIG. 13 is a flowchart detailing transmission, conversion, and reflection of light using the MEMS package illustrated in FIG. 12.

Referring now additionally to FIGS. 12 and 13, the operation of reflecting the converted light 46 in the desired output direction 60, in accordance with an additional embodiment of the present invention, will now be discussed in greater detail. More specifically, an embodiment wherein the source light 42 may be converted into pixels of converted light 46 including various converted wavelength ranges will be discussed herein.

FIG. 12 illustrates an array of MEMS cells 22 grouped in a MEMS package 21. For clarity, only a limited number MEMS cells 22 have been illustrated therein, but a person of skill in the art will appreciate that a plurality of MEMS cells 22 may be included in the MEMS package 21. Similarly, FIG. 12, viewed in light of FIG. 10, illustrates an array of MEMS cells 22 that may emit a converted light 46 in varying converted wavelength ranges. These MEMS cells 22 may include a plethora of individually controlled pixel MEMS cells 22. These pixel MEMS cells 22 may include, but should not be limited to, green MEMS cells 22G, blue MEMS cells 22B, and red MEMS cells 22R. These MEMS cells 22 may respectively reflect a converted light 46 that may include various wavelength ranges, such as a green converted light 46G, a blue converted light 46B, and a red converted light 46R.

These wavelength ranges of converted light 46 may be individually reflected by each MEMS cell 22, forming an array of pixels, in response to the control signal received by the microcontroller 28 of the MEMS device 20. Collectively, the pixels may be reflected as one converted light 46, with a converted wavelength range, as previously discussed. Alternately, the pixels may be selectively reflected such to produce a projected static or animated image.

A person of skill in the art will appreciate that, through the application of conversion coatings 30 with the appropriate wavelength converting materials, such as phosphors, pixels may be created with a converted light 46 of virtually any converted wavelength range. As such, the example provided herein is not intended to be limited in any way, and particularly not limited to the green converted light 46G, blue converted light 46B, and red converted light 46R, or pixels formed therefrom, as described herein.

Referring now to the flowchart 130 illustrated in FIG. 13, the operation of the MEMS device 20 of the present embodiment, which may reflect a converted light 46 with varying converted wavelength ranges, is now described in greater detail. Starting at Block 130S, the control program may be interpreted by the microcontroller 28 to determine the desired converted wavelength range (Block 132). In accordance with the presently described embodiment, the converted wavelength range may include an array of wavelength converted pixels.

The MEMS device 20 may include a plurality of pixels. These pixels may be formed by green MEMS cells 22G, blue MEMS cells 22B, and red MEMS cells 22R. A person of skill in the art will appreciate that any conversion coating 30 may be applied to the repositionable surface 34 of the MEMS cells 22, to create a pixel of converted light 46 with a converted wavelength range, and remain within the scope and spirit of the present invention.

The microcontroller 28 may determine the number of pixels of converted light 46 that may be reflected in the desired output direction 60 for each converted wavelength range. The microcontroller may then instruct a proportion of the correspondingly colored MEMS cells 22 to reflect the converted light 46 in the desired output direction 60. Alternately, the microcontroller 28 may control the duty cycles of the MEMS cells 22 of a corresponding wavelength range or color to alter the amount of light actually emitted by each pixel in the desired output direction 60. In embodiments of the lighting device 10 according to the present invention, where the microcontroller 28 may control the duty cycles of the color MEMS cells 22, such as green MEMS cells 22G, blue MEMS cells 22B, and red MEMS cells 22R, the microcontroller 28 may control the MEMS cells 22 collectively or individually. If controlled individually, the state of the individual pixels may be controlled to create a static or animated image, which may be reflected in the desired output direction 60. A person of skill in the art, after having the benefit of this disclosure, will appreciate equivalent control configuration that are within the scope and spirit of the present invention.

The microcontroller 28 may control the intensity of each pixel by positioning a corresponding MEMS cell 22 to reflect its converted light 46 in the desired output direction 60. To control the MEMS cells 22, the microcontroller 28 may send a control signal to the MEMS cells 22 that correspond with a desired pixel (Blocks 134p1, 134p2, . . . , 134p(n−1), and 134p(n)). Although the control of only four pixels has been represented in FIG. 13, a person of skill in the art will appreciate that a plurality of pixels may be controlled by the microcontroller 28 of the MEMS device 20. The respective MEMS cells 22 may then accept the control signal and position the repositionable surface 34 associated therewith accordingly (Blocks 136p1, 136p2, . . . , 136p(n−1), and 136p(n)). Once the respective MEMS cells 22 have been positioned accordingly, the converted light 46 may be reflected in the desired output direction 60 comprising the desired output wavelength range or image (Block 138). Thereafter, the operation may terminate (Block 130E).

Figure 14:
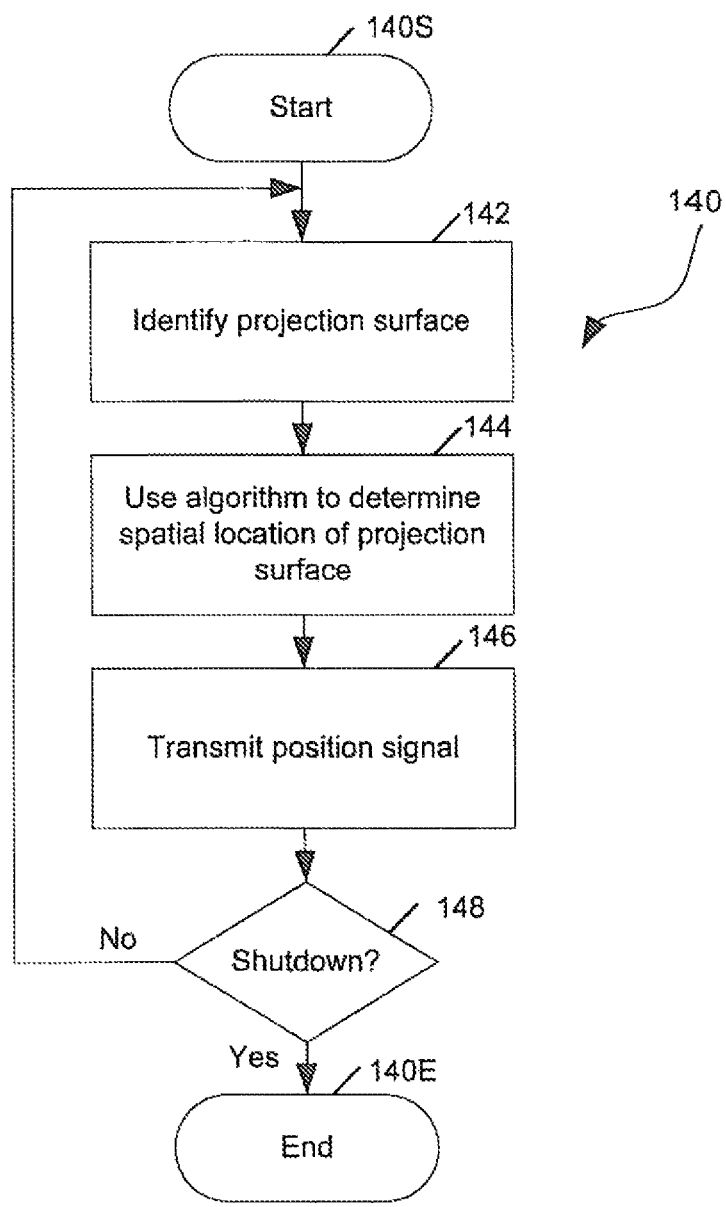
FIG. 14 is a flowchart detailing operation of a position detecting device according to a method aspect of the present invention.

Referring now additionally to FIG. 14, the operation of the detecting the spatial position of a projection surface 62, in accordance with an additional embodiment of the present invention, will now be discussed in greater detail. The operation described in flowchart 140 may begin at Block 140S. The position detecting device 64 may identify a projection surface 62 (Block 142). The position detecting device 64 may use one or more configuration of position sensing components to determine the location of the projection surface 62.

As previously discussed along with the structural description of the position detecting device 64, and as additionally illustrated in FIGS. 7, 7A, 7B, and 7C, the position detecting device 64 may use cameras to determine the location of a projection surface 62. If two or more cameras are used, the position detecting device 64 may determine the distance between the projection surface 62 and the lighting device 10 by performing a depth algorithm. The position detecting device 64 may also use other position detecting configurations, such as, but not limited to, radar, sonar, infrared, RFID, laser targeting, and other position detecting mechanisms that should be apparent to a person of skill in the art.

The position detecting device 64 may include a computer program capable of performing a position calculating algorithm. This algorithm may be used to determine the spatial location of the projection surface 62 (Block 144). In an embodiment of the position detecting device 64 of the lighting device 10 according to the present invention, an array of camera sensors may analyze a series of captured images. These captured images may be captured and analyzed at a high frequency. However, a person of skill in the art will appreciate that images may be captured at any frequency and remain consistent with the scope and spirit of the present invention.

The position detecting device 64 may detect the changes in location of an object, such as the projection surface 62, reported by each camera sensor. The position detecting device 64 may then apply the aforementioned algorithms that may compare the captured images. Algorithms may be used to determine a delta distance that the projection surface 62 has moved between each image captured by each camera sensor. The algorithms may additionally use the delta distance, as reported by each camera sensor, to triangulate the three-dimensional location of the projection surface 62. A person of skill in the art will appreciate additional position detecting mechanisms capable of locating a projection surface 62, as intended to be included within the scope of the present invention.

Once the position detecting device 64 has determined the location of the projection surface 62, it may create a position signal output denoting that location. The position detecting device 64 may then transmit the position signal data to any device capable of interpreting the signal included therein, such as the MEMS device 20 or a repositioning device 66 (Block 146). The operation may then determine whether a shutdown command has been received (Block 148). If no shutdown command has been received, the position detecting device 64 may again perform the operation of Block 142, wherein it may identify the projection surface 62. If a shutdown command has been detected at Block 148, the operation will terminate (Block 140E).

Figure 15:
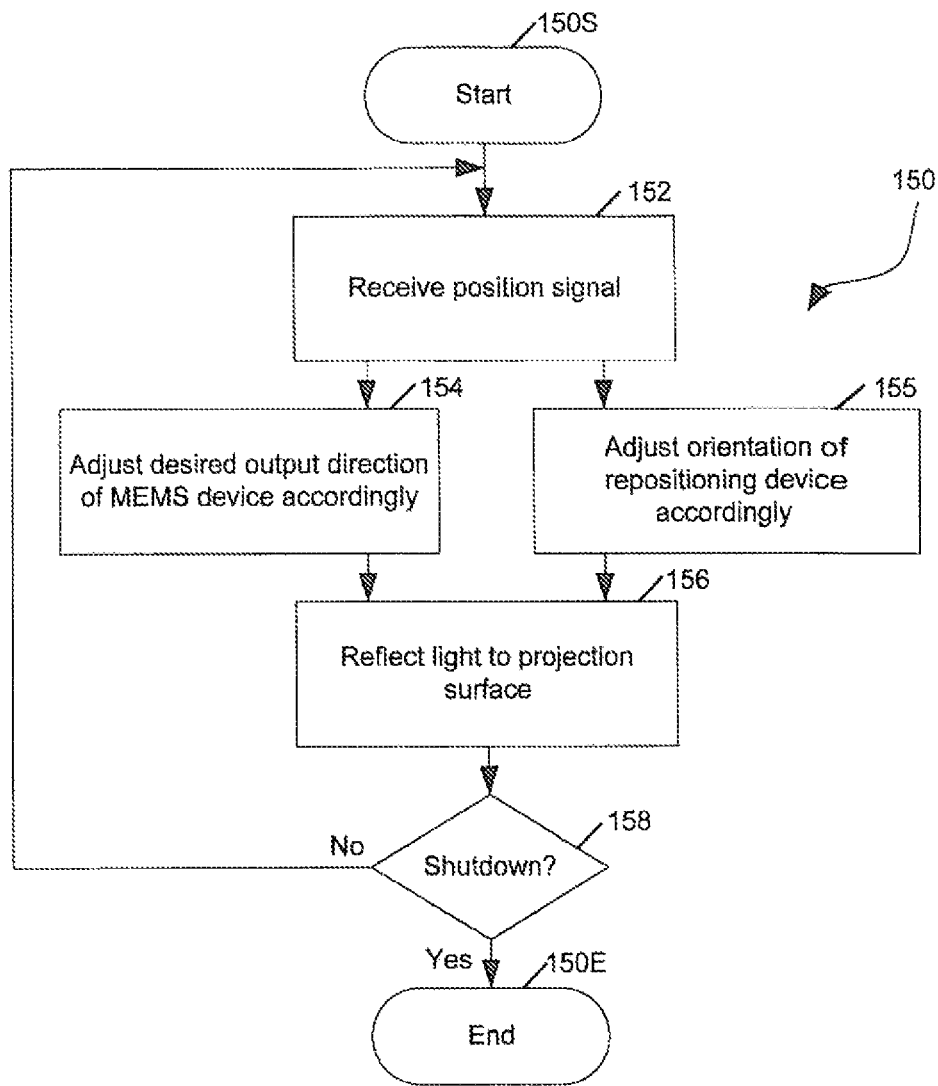
FIG. 15 is a flowchart detailing operation of the MEMS device to reflect light in a desired output direction in response to a position signal according to a method aspect of the present invention.

Referring now additionally to FIG. 15, the operation of directing the desired output direction 60 of the MEMS device 20, in accordance with an embodiment of the present invention, will now be discussed in greater detail. The operation described in flowchart 150 may begin at Block 150S, wherein the device controlling the desired output direction 60 may receive the position signal from the position detecting device 64 (Block 152). The position signal may be received by a MEMS device 20, a repositioning device 66, or another device configured to receive a position signal.

If the position signal is received by the MEMS device 20, the MEMS device 20 may adjust the desired output direction 60 of the MEMS device 20 accordingly (Block 154). Alternately, if the position signal is received by a repositioning device 66, the repositioning device 66 may adjust the orientation of the MEMS device 20, or light reflected therefrom, accordingly (Block 155). The position signal may also be received by both the MEMS device 20 and the repositioning device 66, wherein both the MEMS device 20 and repositioning device 66 would perform the respective operation as described in Blocks 154 and 155. A person of skill in the art will appreciate that additional devices capable of receiving a position signal may receive the position signal and perform the corresponding action as directed from the position signal.

Through the repositioning operation performed by the repositioning device 66 and/or MEMS device 20, the MEMS device 20 may then reflect the converted light 46 in the desired output direction 60, which may be approximately equal to the spatial location of the projection surface 62 (Block 156). The operation may then determine whether a shutdown command has been received (Block 158). If no shutdown command has been received, the operation will return Block 152, wherein it may again receive a position signal. If a shutdown command has been detected at Block 158, the operation will terminate (Block 150E).

If the position output is received by the MEMS device 20, the MEMS device 20 may control the MEMS cells 22 included therein to reflect the converted light 46 to a desired output direction 60 that corresponds with the detected location of the projection surface 62. As the projection surface 62 may reposition itself or move, the MEMS device 20 may continually reorient the desired output direction 60 of the converted light 46 to correspond to the present location of the projection surface 62. As illustrated in FIG. 7C, the projection surface 62 may include a plurality of smaller surfaces. Furthermore, the plurality of smaller surfaces may be scattered about a given area, spatially existing at differing positions and depths from each other.

After locating the smaller surfaces, which may collectively comprise the projection surface 62, the MEMS device 20 may adapt the desired output direction 60 to reflect the converted light 46 to approximately the same areas occupied by the smaller surfaces of the projection surface 62.

The following examples are included solely for illustrative purposes, with the intent to assist a person of skill in the art to better understand the present invention as disclosed herein. The following examples are in no way intended to limit the uses or applications of the present invention. Additionally, the following examples are not intended limit the operation of the lighting device 10 of the present invention to the embodiments listed below. A person of skill in the art will appreciate, after having the benefit of this disclosure, that the scope of the invention disclosed herein is intended to include a multitude of equivalent designs and configurations.

Referring to the previously mentioned example of a projection surface 62 as being a person, as illustrated in FIG. 7B, the position detecting device 64 may detect a specified article of the persons clothes that is desired to receive the converted light 46. For this example, a jacket 69 may be considered to be the projection surface 62. The position detecting device 64 may detect the jacket 69, as it may be repositioned in response to the movements of the person wearing it. The position detecting device 64 may then transmit the position signal to the MEMS device 20, allowing the MEMS device 20 to control the desired output direction 60 to reflect the converted light 46 in only the spatial position currently occupied by the jacket 69. As a result of outputting the converted light 46 in a desired output direction 60 that corresponds with the jacket 69 (projection surface 62), the surface may appear to have a dynamically changing color or pattern.

In another example, referring to the previously mentioned water fountain example illustrated in FIG. 7C, the position detecting device 64 may detect the streams 71 and corresponding droplets 72 of water (smaller surfaces), which collectively create the fountain spray (projection surface 62) outputted by the fountain. The position detecting device 64 may detect the streams 71 and droplets 72 of the fountain spray and generate a position signal. The position signal may then be transmitted to the MEMS device 20. The MEMS device 20 may then control the desired output direction 60 to reflect the converted light 46 in only the spatial positions currently occupied by a stream 71 or corresponding droplet 72.

As a result of outputting the converted light 46 in a desired output direction 60 that corresponds with the smaller surfaces, which collectively create the projection surface 62, the water outputted by the fountain may appear to be illuminated by the light projected thereon. Also, through the selective control of the MEMS cells 22 of the MEMS device 20, the wavelength ranges, and therefore the color, of the converted light 46 may be altered as desired. This may create the advantageous effect of a dynamically colored fountain without the need for static or inefficient under-lighting from a flood light.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A lighting device for directing source light within a predetermined source wavelength range in a desired output direction, the lighting device comprising:
   a micro electromechanical system (MEMS) device that includes at least one operative surface;
   a conversion coating applied to the at least one operative surface; wherein the at least one operative surface receives the source light, converts the source light within a source wavelength range into a converted light within an at least one converted wavelength range that differs from the source wavelength range and redirects the source light towards the desired output direction;
   wherein the MEMS device is a digital micromirror device (DMD) that includes an array of mirrors positionable between multiple angles to reflect the converted light.

2. A lighting device according to claim 1 wherein the source light is a monochromatic light.

3. A lighting device according to claim 1 wherein the source light is a bichromatic light.

4. A lighting device according to claim 1 wherein the source light is a polychromatic light.

5. A lighting device according to claim 1 wherein the source wavelength ranges includes a plurality of wavelength ranges that are selectively enabled.

6. A lighting device according to claim 1 wherein the source wavelength range is within at least one of a blue spectrum and an ultraviolet spectrum.

7. A lighting device according to claim 6 wherein the source wavelength range of the source light within the ultraviolet spectrum has is between 200 nanometers and 400 nanometers.

8. A lighting device according to claim 6 wherein the source wavelength range of the source light within the blue spectrum is between 400 nanometers and 500 nanometers.

9. A lighting device according to claim 1 further comprising a position detecting device; and wherein the desired output direction includes a projection surface.

10. A lighting device according to claim 9 wherein the position detecting device senses a location of the projection surface to define a location of a sensed projection surface.

11. A lighting device according to claim 10 further comprising a repositioning device that repositions the MEMS device to project the converted light to the location of the sensed projection surface.

12. A lighting device according to claim 1 wherein the conversion coating includes a phosphorous wavelength converting material.

13. A method of using a lighting device comprising a micro electromechanical system (MEMS) device having at least one operative surface and a conversion coating applied to the at least one operative surface, the method comprising:
   receiving a source light within a source wavelength range on the at least one operative surface;
   converting the source light received on the at least one operative surface into a converted light within an at least one converted wavelength range that differs from the source wavelength range; and
   reflecting the converted light towards a desired output direction;
   wherein the MEMS device is a digital micromirror device (DMD) that includes an array of mirrors positionable between multiple angles to reflect the converted light to the desired output direction.

14. A method according to claim 13 wherein the source light is a monochromatic light.

15. A method according to claim 13 wherein the source light is a bichromatic light.

16. A method according to claim 13 wherein the source light is a polychromatic light.

17. A method according to claim 13 wherein the source light includes a source wavelength range that is within at least one of a blue spectrum and an ultraviolet spectrum.

18. A method according to claim 16 wherein the source wavelength range of the source light within the ultraviolet spectrum is between 200 nanometers and 400 nanometers.

19. A method according to claim 16 wherein the source wavelength range of the source light within the blue spectrum is between 400 nanometers and 500 nanometers.

20. A method according to claim 13 further comprising the step of sensing a location of the projection surface using a position detecting device to define a location of a sensed projection surface, and repositioning the MEMS device to project the converted light to the location of the sensed projection surface using a repositioning device.

21. A method according to claim 13 wherein the conversion coating includes a phosphorous wavelength converting material.

22. A method according to claim 13 further comprising generating the source light from at least one light source in a source wavelength range.

* * * * *